United States Patent
Ogino et al.

(10) Patent No.: US 8,310,705 B2
(45) Date of Patent: Nov. 13, 2012

(54) IMAGE FORMING APPARATUS, PROGRAM, RECORDING MEDIUM, AND PREVIEW DISPLAY METHOD

(75) Inventors: Kumiko Ogino, Osaka (JP); Takaya Nakatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 604 days.

(21) Appl. No.: 12/505,748

(22) Filed: Jul. 20, 2009

(65) Prior Publication Data

US 2010/0027060 A1    Feb. 4, 2010

(30) Foreign Application Priority Data

Jul. 30, 2008   (JP) ................. 2008-196785

(51) Int. Cl.
  *G06F 15/00*   (2006.01)
  *G06F 17/00*   (2006.01)
(52) U.S. Cl. ....................... 358/1.15; 715/255
(58) Field of Classification Search ............. 358/1.15
  See application file for complete search history.

(56) References Cited

U.S. PATENT DOCUMENTS

| 6,995,855 B2* | 2/2006 | Nagasaka | 358/1.15 |
| 2006/0098111 A1 | 5/2006 | Goh et al. | |
| 2007/0035771 A1* | 2/2007 | Kitamaru | 358/1.18 |

FOREIGN PATENT DOCUMENTS

| CN | 1774040 | 5/2006 |
| JP | 08-314667 | 11/1996 |
| JP | 2001-245136 | 9/2001 |
| JP | 2003-087560 | 3/2003 |
| JP | 2008-070835 | 3/2008 |

* cited by examiner

*Primary Examiner* — Saeid Ebrahimi Dehkordy
(74) *Attorney, Agent, or Firm* — David G. Conlin; Steven M. Jensen; Edwards Wildman Palmer LLP

(57) ABSTRACT

An image forming apparatus is provided that makes it possible to visually identify whether or not additional information is added to image data to be output in a screen in which a preview is displayed easily. The image forming apparatus is provided with an image display portion such as a touch panel for displaying a preview of image data and is capable of outputting such as printing the image data with additional information added thereto. When image data to be output is output with additional information added thereto, a digital multi-functional peripheral synthesizes an existence image showing an existence of the additional information, instead of the additional information, with a preview image to display on the image display portion in displaying the preview image.

11 Claims, 24 Drawing Sheets

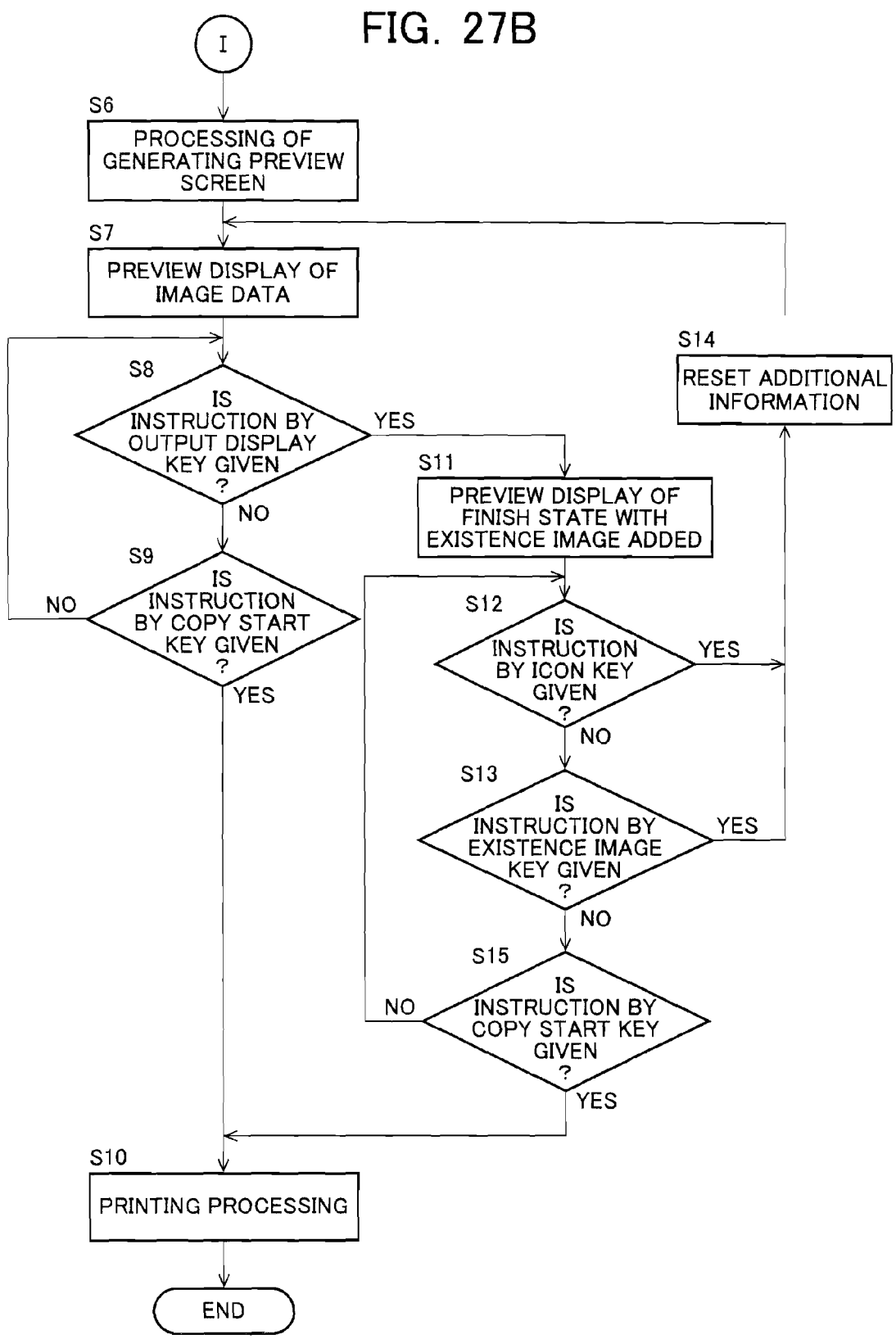

IMAGE FORMING APPARATUS, PROGRAM, RECORDING MEDIUM, AND PREVIEW DISPLAY METHOD

CROSS-NOTING PARAGRAPH

This non-provisional application claims priority under U.S.C. §119 (a) on Patent Application No. 2008-196785 filed in JAPAN on Jul. 30, 2008, the entire contents of which are hereby incorporated herein by reference.

FIELD OF THE INVENTION

The present invention relates to an image forming apparatus capable of displaying a preview of image data before outputting, a program to be installed in a computer that is connected to the image forming apparatus, a computer readable recording medium with the program recorded therein, and a preview display method.

BACKGROUND OF THE INVENTION

Conventionally, some image forming apparatuses such as multi-functional peripherals have a function of displaying a preview of image data that is the object of outputting such as printing and sending.

For example, Japanese Laid-Open Patent Publication No. 2003-87560 discloses an image forming apparatus that displays a finished image showing a state where post-processing is applied to paper on which an image is formed. The image forming apparatus is provided with post-processing means for performing post-processing to the sheet of paper on which an image has been formed, post-processing selecting means for selecting the type of the post-processing, image data reducing means for converting image data stored in image data into image data in a reduced size, and finished image display means for displaying a finished image showing a state where the post-processing selected by the post-processing selecting means is applied to the sheet of paper on which an image is formed on the basis of the image data yet to be reduced by processing the image data in a reduced size.

However, in the technique described in Japanese Laid-Open Patent Publication No. 2003-87560, image data is displayed in reduction to display a finished state where post-processing is applied to printed paper, but the case where image data is printed or sent with additional information such as a stamp, date, and a page number added thereto, is not particularly considered. Accordingly, even if this technique is improved such that a preview image is generated by reducing "image data after additional information is added thereto", the additional information is also displayed in a small size, therefore, when the additional information is small or the additional information is an image showing text, for example, it is difficult to visually identify whether or not being added so that a user does not notice in some cases.

In this manner, in the technique described in Japanese Laid-Open Patent Publication No. 2003-87560, since it is difficult to visually identify whether or not additional image information is added on a screen for a preview display in some cases, it is also difficult to adjust an adding position of the additional image information, or the like.

SUMMARY OF THE INVENTION

An object of the present invention is to provide an image forming apparatus that is possible to facilitate to visually identify whether or not additional information is added to image data to be output on a screen for a preview display, a program to be installed in a computer that is connected to the image forming apparatus, a computer readable recording medium with the program recorded therein, and a preview display method.

Another object of the present invention is to provide an image forming apparatus that includes an image display portion for displaying a preview image of image data to be output and is capable of outputting the image data with additional information added thereto, comprising: a display control portion that, when the image data to be output is output with the additional information added thereto, synthesizes an existence image showing an existence of the additional information, instead of the additional information, with the preview image to display on the image display portion in displaying the preview image.

Another object of the present invention is to provide the image forming apparatus, wherein the preview image is an image generated by reducing the image data to be output.

Another object of the present invention is to provide the image forming apparatus, wherein a size of the existence image to the preview image is in accordance with a relative size of the additional information to the image data to be output.

Another object of the present invention is to provide the image forming apparatus, wherein the display control portion synthesizes the existence image in accordance with an actual adding position of the image data to be output.

Another object of the present invention is to provide the image forming apparatus, wherein the display control portion displays a predetermined icon in a display area different from a display area of the preview image in the image display portion while the preview image is being displayed, and when the predetermined icon is selected by a user, contents of the additional information are displayed in a display area different from the display area of the preview image in the image display portion or displayed by deleting the preview image.

Another object of the present invention is to provide the image forming apparatus, wherein when the predetermined icon is selected by a user, the display control portion displays a list of all of additional information to be added to the image data to be output as the contents.

Another object of the present invention is to provide the image forming apparatus, wherein in displaying the list of all of additional information, the display control portion displays each additional information in an arrangement associated with the image data to be output.

Another object of the present invention is to provide the image forming apparatus, wherein an additional information changing portion that receives a user operation for editing or deleting each of additional information displayed as the list by the image display portion or a user operation for adding new additional information, and changes additional information based on the received user operation, is included.

Another object of the present invention is to provide the image forming apparatus, wherein when the preview image is deleted after additional information is changed by the additional information changing portion, the display control portion displays the preview image again.

Another object of the present invention is to provide the image forming apparatus, wherein a setting portion for setting a display color of the existence image by a user is included.

Another object of the present invention is to provide the image forming apparatus, wherein the image data to be output is image data that is input from any of a scanner apparatus, an attachable/detachable storage apparatus, and a communication line, or image data that is read from a storage apparatus provided in the image forming apparatus.

Another object of the present invention is to provide a program to be installed in a computer connected to an image forming apparatus, wherein the program causes the computer to execute: a step of generating a preview image from image data to be output by the image forming apparatus to display on a display portion of the computer; and a step of, when the image data is output with additional information added thereto by the image forming apparatus, generating an existence image showing an existence of the additional information, instead of the additional information, and synthesizing with the preview image to display on the display portion in displaying the preview image.

Another object of the present invention is to provide a computer readable recording medium with the above-mentioned program recorded therein.

Another object of the present invention is to provide a preview display method, comprising: a step in which a computer generates a preview image from image data to be output by an image forming apparatus connected to the computer to display on a display portion of the computer; and a step in which, when the image data is output with additional information added thereto by the image forming apparatus, the computer generates an existence image showing an existence of the additional information, instead of the additional information, and synthesizes with the preview image to display on the display portion in displaying the preview image.

BRIEF DESCRIPTION OF THE DRAWINGS

FIGS. 27A and 27B are flowcharts for explaining an example of processing when performing a preview display in printing in the digital multi-functional peripheral of FIGS. 2 and 3;

PREFERRED EMBODIMENTS OF THE INVENTION

Now, a preferred embodiment of the present invention will hereinafter be described with reference to the drawings. An embodiment in which an image forming apparatus according to the present invention is applied to a digital multi-functional peripheral having a print function, a copy function, and a facsimile sending and receiving function, etc., will hereinafter be described specifically with reference to the drawings showing the embodiment.

<Apparatus Configuration>

Figure 1:
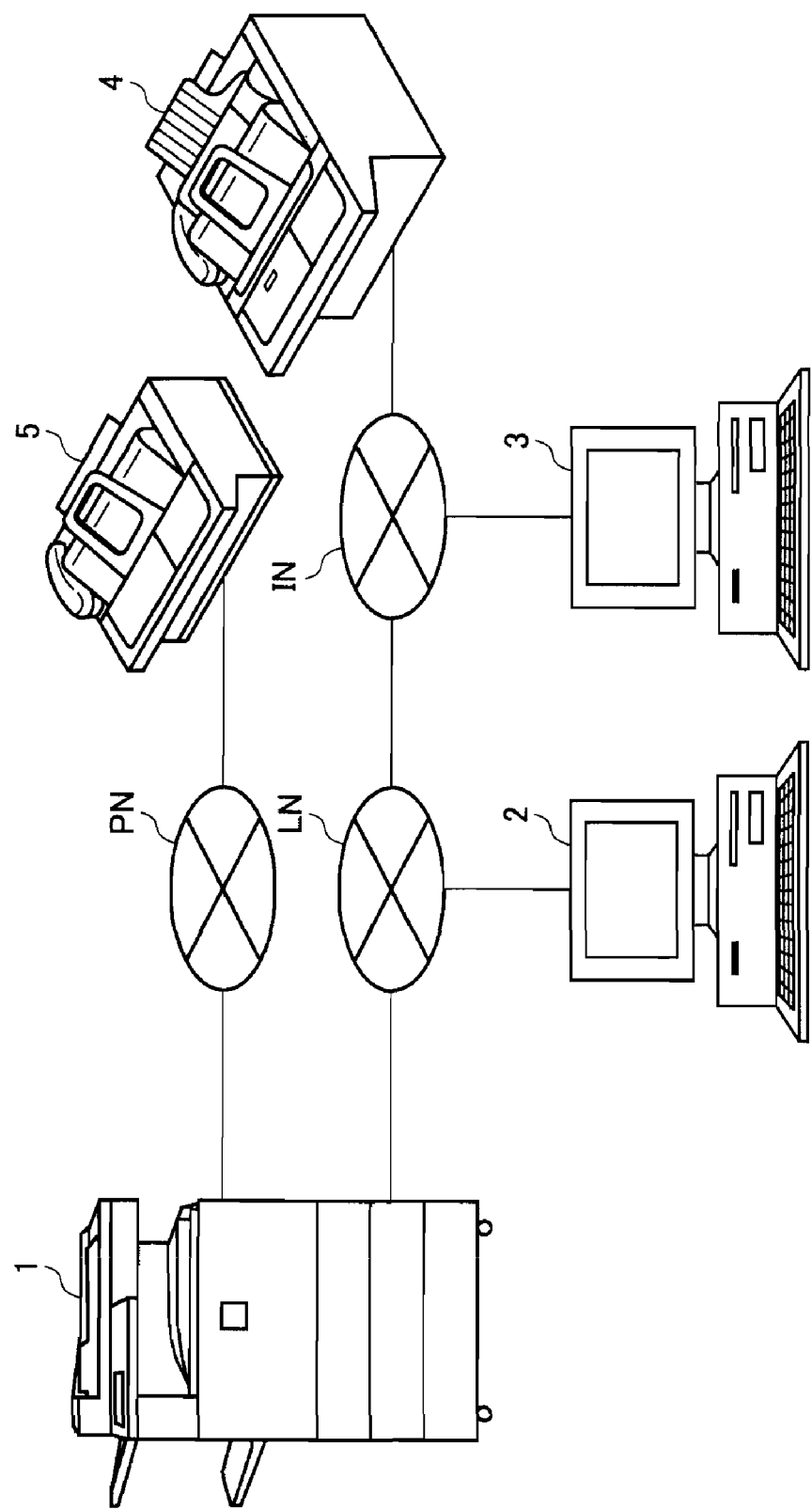
FIG. 1 is a schematic diagram for showing an exemplary configuration of an image processing system constructed by using a digital multi-functional peripheral as an example of an image forming apparatus according to an embodiment of the present invention.

FIG. 1 is a schematic diagram for showing an exemplary configuration of an image processing system constructed by using a digital multi-functional peripheral as an example of an image forming apparatus according to an embodiment of the present invention. In FIG. 1, 1 denotes a digital multi-functional peripheral, 2 and 3 denote external computers, 4 denotes an internet facsimile apparatus (internet FAX apparatus), and 5 denotes a facsimile apparatus.

The digital multi-functional peripheral 1 has a print function and a copy function, as well as a function of sending and receiving image data by facsimile (facsimile function) and/or a function of sending and receiving image data by internet FAX (internet FAX function). This digital multi-functional peripheral 1 is connected to various external devices through a communication network. For example, an external computer 2 such as a personal computer (PC) is connected to a communication network LN that is laid as a local communication network, and an external computer 3 and an internet FAX apparatus 4 are connected to an internet network IN that is connected through a gateway not shown in the figure, or the like. Further, an external facsimile apparatus 5 is connected through a public switched telephone network PN. Note that, as described above, although description will be given only for the case where the image forming apparatus according to the present invention is applied to the digital multi-functional peripheral 1, any of the external computers 2 and 3, the internet FAX apparatus 4, and the facsimile apparatus 5 is also applicable as the image forming apparatus according to the present invention.

Figure 2:
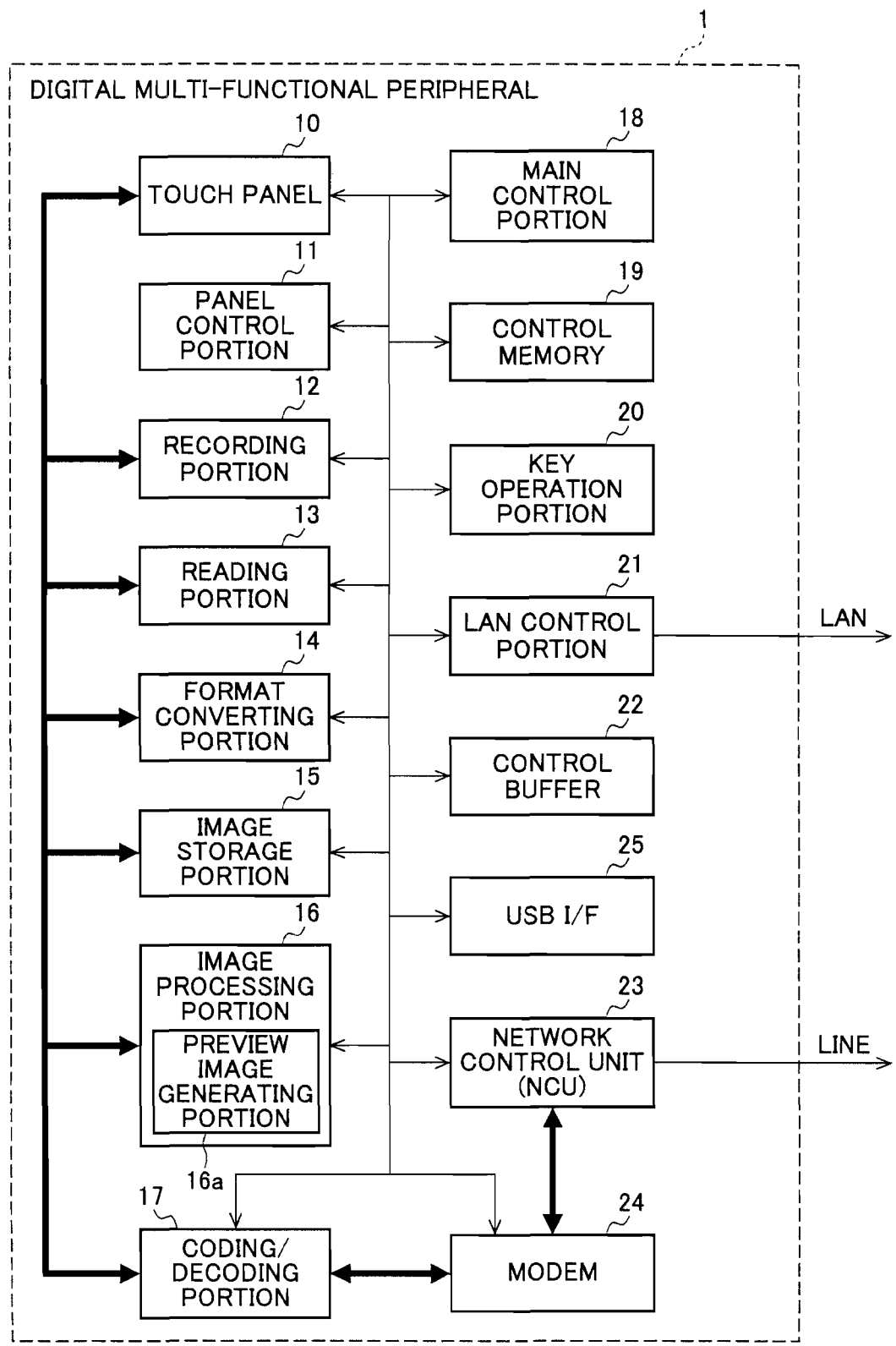
FIG. 2 is a schematic block diagram for showing an exemplary configuration of the digital multi-functional peripheral of FIG. 1.
Figure 3:
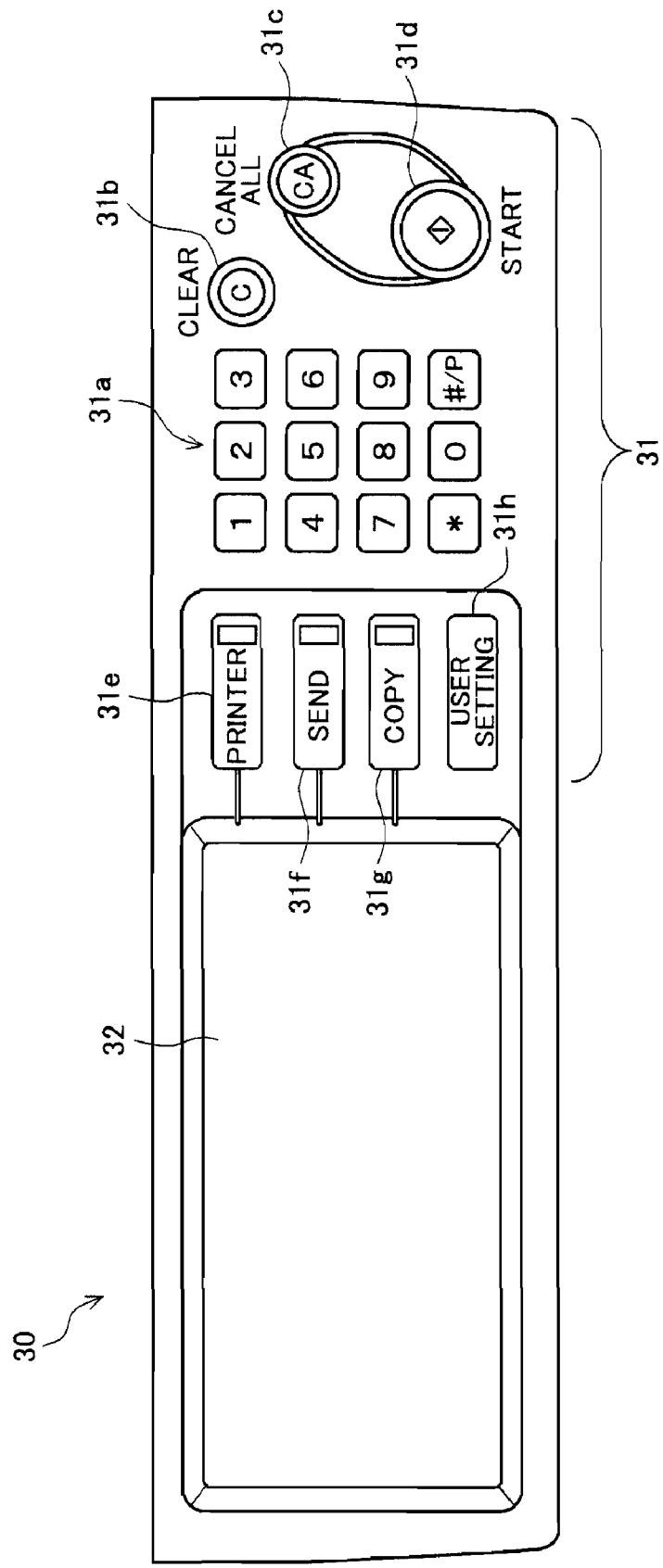
FIG. 3 is an external view for showing an example of a touch panel and a key operation portion in the digital multi-functional peripheral of FIG. 2.

Description will be given for a configuration and an operation of the digital multi-functional peripheral 1. FIG. 2 is a schematic block diagram for showing an exemplary configuration of the digital multi-functional peripheral of FIG. 1, and FIG. 3 is an external view for showing an example of a touch panel and a key operation portion of the digital multi-functional peripheral of FIG. 2.

The digital multi-functional peripheral 1 illustrated in FIG. 2 is provided with a touch panel 10, a panel control portion 11, a recording portion 12, a reading portion 13, a format converting portion 14, an image storage portion 15, an image processing portion 16, a coding/decoding portion 17, a main control portion 18, a control memory 19, a key operation portion 20, a LAN (Local Area Network) control portion 21, a control buffer 22, a network control unit (NCU) 23, a modem 24, and a USB (Universal Serial Bus) interface (I/F) 25. In addition, the digital multi-functional peripheral 1 may be provided with a post processing apparatus that performs the punching, stapling processing and the like, and description will hereinafter be given with reference to an embodiment provided with the post processing apparatus.

The main control portion 18 is comprised of a CPU (Central Processing Unit), a DSP (Digital Signal Processor), or the like. The control memory 19 is comprised of a nonvolatile memory or the like, such as a ROM (Read Only Memory) or an EEPROM (Electrically Erasable and Programmable ROM). A program (firmware) and various setting data are stored in the control memory 19 so as to be readable from the main control portion 18. Among them, at least the various setting data is stored in a rewritable memory. The program and the various setting data may be stored in hard disc as an exemplary configuration of the image storage portion 15, which will be described below. The control buffer 22 is comprised of a volatile memory such as a RAM (Random Access Memory).

The above-described program is used for the main control portion 18 to carry out a command concerning generation and display of a preview image or an existence image, which will be described below, according to the present invention, as well as a command concerning generation/sending/reception, etc., of a facsimile image and an electronic mail, etc., a command concerning reading of an original, a command concerning printing, a command concerning reading and printing (that is, copying) of an original, and the like, with respect to other parts. This program is expanded by the main control portion 18 on the control buffer 22 and is executed by referring to various setting data, which will be described below, appropriating the control buffer 22 as a data area for temporal storing (working).

The reading portion 13 reads an original as a bitmap image of RGB (R: Red, G: Green, and B: Blue) with a predetermined resolution by a scanner using a CCD (Charge Coupled Device) and outputs the read RGB image data (dot image data) to the image processing portion 16. The image processing portion 16 is comprised of an ASIC (Application Specific Integrated Circuit) or the like, and applies various image processing to target image data. An example of the image processing will be described below. The ASIC may be incorporated with other parts such as the coding/decoding portion 17.

The image storage portion 15 is comprised of hard disc or the like, and stores image data that has been read by the reading portion 13 and has passed through the image processing portion 16, image data that has been received from outside through the LAN control portion 21, the NCU 23, etc., and the like. When image data is stored in the image storage portion 15, data that has been coded by the coding/decoding portion 17 may be also stored. Moreover, the image storage portion 15 may temporarily save intermediate data generated during image processing at the image processing portion 16.

The coding/decoding portion 17 compresses image data by coding and decodes (expands) the coded image data to original image data. For example, the coding/decoding portion 17 performs coding of image data read from an original, decoding of the coded data, decoding of coded image data received from outside, and the like. In the coding/decoding portion 17, coding systems corresponding to purposes are usable, including JPEG (Joint Photographic Experts Group) that is generally used in filing, and MH (Modified Huffman), MR (Modified READ) and MMR (Modified Modified READ) that are generally used in facsimile communication. As the coding system, MH is employable in IP facsimile communication, and JPEG and JBIG (Joint Bi-level Image Experts Group) as well as MH, MR, and MMR are employable in internet facsimile communication.

The format converting portion 14 converts read image data or image data received from outside into a predetermined file format such as a PDF (Portable Document Format), a GIF (Graphics Interchange Format), or a TIFF (Tag Image File Format).

The recording portion 12 is provided with a printer apparatus that employs a printing system such as an electrophotographic system or an inkjet system, and records (that is, prints) image data and the like stored in the image storage portion 15 on recording paper. The USB I/F 25 is an I/F for connecting to a USB device such as a USB memory, and outputs image data and the like after original reading that is stored in the image storage portion 15 or reads a file from the USB device.

The modem 24 is comprised of a facsimile modem capable of facsimile communication, and is connected to a telephone line and is directly connected to the NCU 23. The NCU 23 is connected to the telephone line to control the line. That is, the NCU 23 is a hardware that performs an operation of closing and opening the line with an analogue public switched telephone network (PSTN), and connects the modem 24 to the public switched telephone network as the occasion demands. Such a configuration enables sending image data stored in the image storage portion 15 to outside by facsimile, receiving facsimile image data from the telephone line to store in the image storage portion 15, or printing by the recording portion 12 directly.

The LAN control portion 21 is connected to a LAN and performs communication of electronic mail data and communication of internet FAX via an internet. The internet FAX uses a LAN interface or the like to send and receive an electronic mail through a computer network such as a LAN.

The touch panel 10 or the key operation portion 20 receives an operation for selecting desired processing out of processing of reading an original, processing of sending image data and printing, etc., an operation for starting the processing, an operation for performing a setting that is necessary when each processing is executed (a selecting operation or an inputting operation), and the like. Various examples of the setting include a setting of the number of print sheets in printing, a setting of punch or staple, and a setting of destination information in sending a facsimile image or an electronic mail.

The key operation portion 20 is provided with a key group necessary for operations. The touch panel 10 has a display portion and an operation receiving portion such as a touch sensor. The touch panel 10 is subjected to display control and operation reception control by the panel control portion 11. That is, the panel control portion 11 performs the display control for the display portion and the operation reception control for the operation receiving portion in the touch panel 10.

On the display portion of the touch panel 10, a current operating state, setting information (for example, sending destination, etc.,) and the like are displayed. The display is realized when the panel control portion 11 performs control to display a GUI (Graphical User Interface) image. The GUI enables to change the display and an operation received position depending on a user operation. Each GUI and an image thereof may be stored so as to be readable in an internal memory of the panel control portion 11 or the control memory 19. In addition, as the display portion, display devices in various display systems including liquid crystal displays and organic EL (Electroluminescence) displays are employable.

The user operation received on the touch panel 10 is interpreted by the panel control portion 11 and is transmitted as an operation signal to the main control portion 18. The user operation received by the key operation portion 20 is interpreted by the key operation portion 20 itself and transmitted as an operation signal to the main control portion 18. The main control portion 18 issues a command in accordance with the operation signal obtained in this manner to other parts to cause the other parts to execute processing in accordance with the user operation. Note that, although description has been given with reference to the touch panel 10 in which the display device and the operation portion are integrated, only the display apparatus may be simply provided instead of the touch panel 10 and, in that case, where the user operation is received only by the key operation portion 20.

The touch panel 10 and the key operation portion 20 may be configured as an operation panel 30 as illustrated in FIG. 3, and the operation panel 30 is comprised of a key operation portion 31 (corresponding to the key operation portion 20) provided with various hardware keys and a touch panel 32 (corresponding to the touch panel 10) comprised of a liquid crystal display and a touch sensor. The present invention will hereinafter be described in detail with the touch panel 32 and the key operation portion 31 applied in the configuration of FIG. 1 instead of the touch panel 10 and the key operation portion 20.

The key operation portion 31 is provided with, as hardware keys, a ten key 31*a* for inputting numeric values, a clear key 31*b* for clearing input set values, a cancel all key 31*c* for canceling all of various input settings, and a start key 31*d* for receiving instructions of start of copying, start of sending, etc., as well as function switch keys 31*e*, 31*f*, and 31*g* for switching a print function, a sending function and a copy function, and a system setting key 31*h* for receiving a setting by a user.

An exemplary operation in the digital multi-functional peripheral 1 having the above-described exemplary configuration will be described.

<Original Reading Operation>

An original reading operation is performed when image data of a read original is stored (filed) in the image storage portion 15, when image data of a read original is sent to outside, when image data of a read original is printed (that is, copied), and the like.

When a user operation to perform processing requiring original reading is received by the operation panel 30, the main control portion 18 gives an instruction to the reading portion 13, the image storage portion 15, the image processing portion 16, the coding/decoding portion 17, and the like to execute processing as will be described below.

The reading portion 13 optically reads an image of an original placed on a document platen or an automatic document feeder and provides the image processing portion 16 with RGB image data (bitmap data of RGB) as a result of reading. The image processing portion 16 executes various image processing (hereinafter, referred to as original image processing) such as A/D conversion, shading correction, and γ correction for the RGB image data. Here, the shading processing is processing to remove various distortions generated in an illumination system, an image focusing system, and an image sensing system of the reading portion 13.

As the original image processing, original determination processing and segmentation processing may be executed subsequently to the A/D conversion, the shading correction, and the γ correction. The original determination processing includes processing of determining a type of the original and processing of determining whether the original is a color original or a monochromatic original based on input image data (image data after the application of the γ correction in this case). Examples of the type of the original include a text original, a printed photograph original, and text and printed photograph original in combination thereof. The image processing portion 16 outputs a determination signal (hereinafter, referred to as original determination data) as a result of the original type determination processing and the monochromatic/color original determination processing. The segmentation processing is processing of determining to what kind of area each pixel of the input image data (image data after the application of the γ correction in this case) belongs, and an example thereof includes processing of determining to which area including a black text area, a color text area and a halftone area each pixel belongs. The image processing portion 16 outputs segmentation data as a result of the determination. Note that, the segmentation processing may be executed based on the result of the above-described original determination processing and monochromatic/color original determination processing.

The original determination data and the segmentation data are stored in the image storage portion 15 in association with corresponding image data (image data after the application of the original image processing). At this time, the original determination data and the segmentation data are coded by the coding/decoding portion 17 and each coded data is thereafter stored in the image storage portion 15 in association with the corresponding image data. Note that, although the coding in storing in the image storage portion 15 is not essential, description will be given assuming that the image data is stored in a state of being coded. This is also the same in operations other than the original reading operation.

<Printing Operation>

By the above-described original reading operation, processing up to filing of the image data of the read original is completed. Next, description will be given for a printing operation when the image data of the read original is printed (that is, when the original is copied). When the user operation to perform processing that requires printing is received by the operation panel 30, the main control portion 18 gives an instruction to the recording portion 12, the image storage portion 15, the image processing portion 16, the coding/decoding portion 17, and the like to execute processing as will be described below. Note that, the main control portion 18 also gives an instruction to the reading portion 13 (original reading instruction), for example, when a copy operation is performed.

The digital multi-functional peripheral 1 is also capable of adding additional information such as a stamp, date (or date and time), and a page number to image data in printing, and when such an adding instruction is given, the main control portion 18 controls the image processing portion 16. It can be said that the additional information added to the image data is an additional image. The additional information is stored in the control memory 19 and is read out as the occasion demands. Of course, the additional information may be originally stored as data of the additional image. In addition, it is recommendable that a plurality of additional information may be stored in the control memory 19 and additional setting information may be stored in the control memory 19. The additional setting information includes at least information showing a position to add to the image data (hereinafter, referred to as an adding position), and when a plurality of additional information is stored, information that indicates any of which is to be selected is also included. Moreover, when an instruction to execute the punching or stapling processing by the post processing apparatus is given, the main control portion 18 also controls the post processing apparatus.

The coding/decoding portion 17 reads and decodes image data to be printed and original determination data and segmentation data corresponding thereto from the image storage portion 15, and gives the decoded image data to the image processing portion 16. The image processing portion 16 executes various image processing (hereinafter, referred to as image processing for printing) for the decoded image data (RGB image data). As will be schematically described below, examples of the image processing for printing include image quality adjustment processing, two-color processing, color correction processing, black generation and under color removal processing, spatial filter processing, scaling processing, output tone correction processing, and halftone generation processing. The black generation and under color removal processing, the spatial filter processing, and the halftone generation processing are processing in accordance with various areas indicated by the segmentation data.

As the image quality adjustment processing, a background is detected from the decoded image data to perform background removal. Moreover, as the image quality adjustment processing, RGB adjustment (color adjustment; entire color adjustment of redness or blueness), brightness adjustment, and vividness adjustment are also performed for the image data after the application of the background removal based on setting information set by a user from the operation panel 30. At this time, adjustment in accordance with an original type indicated by the original determination data may be performed.

As the color correction processing, CMY data having components of CMY (C: Cyan, M: Magenta, Y: Yellow) which are complementary colors of RGB is generated from the RGB data after the application of the image quality adjustment processing and processing of enhancing color reproduction is performed. As the black generation and under color removal processing, black generation processing of generating black (K) data from the CMY data after the application of the color correction and under color removal processing of subtracting the K data obtained by the black generation from the original CMY data to generate new CMY data. As the spatial filter processing, enhancement processing or smoothing processing is performed for CMYK data which is data of the four colors. When a two-color mode for outputting the image data in two colors (for example, red and black) is selected, the two-color processing is performed. As the two-color processing, processing of converting the RGB data into CMY data that represents specified two colors (red and black in this case) is performed. In the case of the two-color mode, the black generation and under color removal processing is executed for the CMY data after the application of the two-color processing and the spatial filter processing is also executed, however, the color correction processing is not performed.

As the scaling processing, image enlarging processing or image reducing processing is performed for the CMYK data after the application of the spatial filter processing based on a printing copy ratio set by the user operation from the operation panel 30. The printing copy ratio is a copy ratio of a printed image for the image indicated by read and stored image data. Of course, the printing copy ratio is not limited to a copy ratio obtained by the user operation and is a copy ratio set as default when no operation is performed for the printing copy ratio. As the output tone correction processing, output γ correction processing of outputting to a recording medium such as recording paper is performed for the CMYK data. As the halftone generation processing, tone reproduction processing of outputting an image by error diffusion processing and dither processing is performed for the CMYK data after the application of the output tone correction processing. In the output tone correction processing and the halftone generation processing, processing in accordance with an original type indicated by the original determination data may be performed, for example, including differentiating processing contents between a text area and other areas.

The CMYK data after the application of the halftone generation processing is provided to the recording portion 12. Description will be given for the case where additional information is added. There are a method for applying the scaling processing also to the additional information in accordance with a magnification of print data and a method for not applying the scaling processing to the additional information regardless of a magnification of print data. First, when the scaling processing is also performed for the additional information, the main control portion 18 reads out the additional information and information showing an adding position, the main control portion 18 or the image processing portion 16 converts into image data as the occasion demands, and the image data of the additional information is given to the image processing portion 16 before the scaling processing. Note that, the conversion is not necessary when additional image data is originally stored. Subsequently, the image processing portion 16 may synthesize the image data of the additional information and image data of an addition destination that is image data before the scaling processing at the above-described adding position.

When the scaling processing is not performed for the additional information, the main control portion 18 reads out the additional information and information showing an adding position, and the main control portion 18 or the image processing portion 16 converts into image data as the occasion demands. In this example, CMYK data is obtained by the conversion. Note that, the conversion is not necessary when additional image data is originally stored. Subsequently, the image processing portion 16 may synthesize the image data of the additional information and image data of an addition destination that is image data after the application of the scaling processing (the above-described CMYK data to which the output tone correction processing or the halftone generation processing is applied) at the above-described adding position.

In either case, it is possible to output CMYK data after the application of the halftone generation processing with the additional information added thereto by the image processing portion 16. Note that, in the digital multi-functional peripheral 1, a user is able to set additional information and an adding position thereof are able to be set by the user using the operation panel 30 while performing a preview display described below.

The recording portion 12 receives the image data to which the image processing for printing has been given by the image processing portion 16 in this manner (CMYK image data in this example) and generates a hard copy (prints out) by an electrophotographic system, an inkjet system, or the like. Then, the post processing apparatus executes the punching or stapling processing for printed sheets as the occasion demands. Note that, the data that is the object for the printing operation described here is not limited to the image data read by the reading portion 13, and, for example, image data (image file) that has been previously transferred from an external recording medium, a PC connected through a network, or the like and stored in the image storage portion 15 is also applicable in the same manner. The printing operation for the image data that has been received by facsimile and stored in the image storage portion 15 will be described below.

<Preview Display Operation for Image Data to be Printed>

Next, description will be given for an operation of displaying a preview of image data stored in the image storage portion 15 as a result of original reading on the touch panel before printing (preview display operation). The digital multi-functional peripheral 1 is configured so as to allow image data to be printed to be displayed for previewing (thumbnail display). The preview display operation is performed when the user operation to perform processing that requires the preview display is received by the operation panel 30. For example, the preview display operation is also performed when a setting is made such that a preview of the image data after the original reading is firstly displayed before executing printing.

The main control portion 18 gives an instruction to the image storage portion 15, the image processing portion 16, the coding/decoding portion 17, the panel control portion 11, and the like to execute processing as will be described below. Note that, the main control portion 18 also gives an instruction to the reading portion 13 (original reading instruction), for example, when an operation of copying an original is performed.

The coding/decoding portion 17 reads and decodes image data to be displayed for previewing and original determination data and segmentation data corresponding thereto from the image storage portion 15, and gives the decoded data to the image processing portion 16. The image processing portion 16 executes various image processing (hereinafter, referred to as image processing for previewing) for the decoded image data (RGB image data). As will be schematically described below, examples of the image processing for previewing include image quality adjustment processing, two-color processing, color correction processing, spatial filter processing, scaling processing, and output tone correction processing. The spatial filter processing and the output tone correction processing are processing in accordance with various areas indicated by the segmentation data.

The image quality adjustment processing here is the same as the image quality adjustment processing in the image processing for printing. As the color correction processing, processing of converting the image data after the application of the image quality adjustment processing (RGB data) into R'G'B' data based on display characteristics of the touch panel 32. As the spatial filter processing, enhancement processing or smoothing processing is performed for the R'G'B' data.

As the scaling processing, image enlarging processing/image reducing processing in accordance with a printing copy ratio is applied to the R'G'B' data after the application of the spatial filter processing, and processing of converting a pixel number of the R'G'B' data into a pixel number (display resolution) of the touch panel 32 is performed and image enlarging processing or image reducing processing is performed based on a preview display magnification set by the user operation from the operation panel 30 at the same time. The preview display magnification is a fixed display magnification such as twice and four times, for example, and is a display magnification of an image in the preview display. Of course, the preview display magnification is not limited to a display magnification obtained by the user operation, and is a display magnification set as default when no operation is performed for the preview display magnification.

A preview image generating portion 16a provided in the image processing portion 16 generates an image for the preview display (preview image) mainly by such scaling processing for the preview display.

Description will be given for a preview image when additional information is added thereto. When image data to be output is output with additional information added thereto in the digital multi-functional peripheral 1 of the present invention, the panel control portion 11 performs control to display an existence image showing an existence of additional information instead of the additional information. Thus, the preview image generating portion 16a generates such an existence image and synthesizes with a preview image generated from the image data to be output to generate a preview image with the existence image.

The additional information is able to be output with image data to be printed by performing the scaling processing in accordance with a print magnification, or is also able to be output in a state of being added to image data to be printed, to which the scaling processing in accordance with a print magnification has been given. First, when the scaling processing is also performed for the additional information to output, the main control portion 18 reads out an adding position of the additional information and information showing the additional information (or a size of the additional information) and gives them to the image processing portion 16 before the scaling processing. Subsequently, the preview image generating portion 16a generates R'G'B' data of an existence image showing an existence of the additional information from the additional information (or a size of the additional information) to combine the generated R'G'B' data with image data of an addition destination that is image data before the scaling processing at the above-described adding position. Then, the image enlarging processing/image reducing processing in accordance with a print magnification may be applied to the R'G'B' to which the existence image has been added. In this manner, as main characteristic features of the present invention, not image data of additional information but an existence image is displayed in a preview display.

When the scaling processing is not performed for the additional information, the main control portion 18 reads out an adding position of the additional information and information showing the additional information (or a size of the additional information) and gives them to the image processing portion 16. Subsequently, the preview image generating portion 16a generates R'G'B' data of an existence image showing an existence of the additional information from the additional information (or a size of the additional information) to combine the generated R'G'B' data with R'G'B' data after the application of the image enlarging processing/image reducing processing in accordance with a print magnification at the above-described adding position, and performs processing for converting the number of pixels of the R'G'B' data after the addition into the number of pixels (display resolution) of the touch panel 32 and the image enlarging processing or image reducing processing based on a preview display magnification set by the user operation from the operation panel 30 at the same time.

Moreover, when the punching or stapling processing is applied by the post processing apparatus, image data for post processing such as punch or staple may be output by being synthesized with a preview image generated from image data to be printed (and data of an existence image of the additional information) at a punching position or a stapling position. Alternatively, separately from a preview image generated from image data to be printed (and data of the existence image of the additional information), image data for post processing such as punch or staple may be output to be aligned in adjacent thereto. In the latter case, since the synthesizing processing is not required, the processing time becomes shorter. Either method is capable of displaying a finish state of paper on which an image is to be formed in the preview display of image data.

As the output tone correction processing, output γ correction processing for displaying image data on the touch panel 32 is performed for the R'G'B' data of the preview image or the preview image and the R'G'B' data of the image for post processing. In the output tone correction processing, processing in accordance with an original type indicated by the original determination data may be performed, for example, including differentiating processing contents between a text area and other areas.

The two-color processing is executed only when a two-color mode for outputting image data in two colors of red and black, for example, is selected. As the two-color processing, processing of converting the RGB data after the application of the image quality adjustment processing into CMY data that represents specified two colors (red and black in this case) is performed. The generated CMYK data is converted into R'G'B' data based on display characteristics of the touch panel 32 at the subsequent color correction processing.

The R'G'B' data generated by the preview image generating portion 16a and processed in the output tone correction processing is provided to the touch panel 32. The panel control portion 11 performs control for the touch panel 32 to display an image corresponding to the R'G'B' data in a state of being incorporated in a GUI image and displays the GUI image on the touch panel 32. A user is able to confirm an image displayed for previewing that includes the existence image showing an existence of the additional information and determine whether to directly execute or stop printing or whether to delete the additional information or execute changing of the adding position (or changing of the additional information) to perform an operation corresponding thereto.

Note that, the data that is the object for the preview display operation described here is not limited to the image data read by the reading portion 13, and image data (image file) that has been previously transferred from an external recording medium, a PC connected through a network, or the like and stored in the image storage portion 15, for example, is also applicable in the same manner. The preview display operation for the image data that has been received by facsimile and stored in the image storage portion 15 will be described below.

<Supplement for Original Reading, Preview Display and Printing>

Although description has been given for the preview display operation separately from the printing operation, the printing operation may be firstly performed such that the image data (CMYK data) after the application of the output tone correction processing is converted into the R'G'B' data based on display characteristics of the touch panel 32, is given conversion processing corresponding to the number of pixels (display resolution) of the touch panel 32 and scaling processing in accordance with a reducing/enlarging ratio in the preview display, and is displayed on the touch panel 32. Since the printing operation is completed to a certain extent and the printing operation after the preview display is able to be completed quickly, it is useful in a case where a setting is made such that a preview is previously displayed, for example, when the copy operation is performed. Such processing is applicable in the case of adding the existence image of the additional information.

In addition, an example in which the coded image data, the original type data and the segmentation data are stored in the image storage portion 15 in association with one another has been taken as the original reading operation, based on which the printing operation and the preview display operation have been also described. As an alternative method thereof, coding may be performed only for the image data read by the reading portion 13, which is temporarily stored in the image storage portion 15. In this case, it may be configured such that the image processing portion 16 applies the original type determination processing and the segmentation processing for the image data that has been read from the image storage portion 15 and decoded by the coding/decoding portion 17 in the printing operation and the preview display operation. In addition, such an alternative method is also applicable in sending image data such as sending by facsimile or sending by internet FAX, which will be described below.

<Printing Operation for Image Data Received by Facsimile>

Next, description will be given for the printing operation for image data received by facsimile communication. When detecting a facsimile communication request by the modem 24, the main control portion 18 gives an instruction to the recording portion 12, the image storage portion 15, the image processing portion 16, the NCU 23, the modem 24, and the like to execute processing as will be described below.

First, the modem 24 and the NCU 23 sequentially receive image data (compressed image data) sent from a sending source while performing communication procedure and expands the received compressed image data, and executes rotating processing (processing of rotating a sending direction), resolution conversion processing, and the like as the occasion demands to provide to the image processing portion 16 at the same time.

Since the image data received by facsimile communication is black-and-white binary data, particular processing is not performed for the image data (K data) to which processing such as expansion has been given in the image processing portion 16, which is directly provided to the recording portion 12. The recording portion 12 receives the image data and executes printing by an electrophotographic system, an inkjet system, or the like. It is also possible to perform printing for the image data received by facsimile communication after adding the above-described additional information thereto.

Description has been given for the facsimile reception of the monochromatic image, but when a color facsimile image (RGB data) is received, the image processing portion 16 may execute the image processing for facsimile reception described here for the RGB data.

<Preview Display Operation for Image Data Received by Facsimile>

The preview display operation for image data received by facsimile communication will be briefly described based on the printing operation for the same image data. The preview display operation is performed, for example, when a previous setting or a user operation to execute printing after confirming the received image data in advance is performed. In the preview display operation, when the additional information is added to the image data to which processing such as expansion has been given, the image processing portion 16 combines this image data with the image data of an existence image showing an existence of the additional information, and then performs conversion processing corresponding to a pixel number (display resolution) of the touch panel 32 and scaling processing in accordance with a reducing/enlarging ratio in the preview display, and the image data subjected to the scaling processing is displayed on the touch panel 32. A user is able to confirm the image displayed for previewing and determine whether to execute or cancel printing to perform a printing or canceling operation.

<Facsimile Sending Operation>

Next, description will be given for a sending operation when image data of a read original is sent by facsimile. The facsimile image data is sent to destination (sending destination) information set by the user operation from the touch panel 32 or the key operation portion 31. The destination information (telephone number in this example) is stored in the control memory 19 and is read as necessary. The destination information is generally stored as address book data so that information of each of destinations is viewable and selectable, or is directly input before sending.

When the user operation to execute the facsimile sending is received by the operation panel 30, the main control portion 18 gives an instruction to the image storage portion 15, the image processing portion 16, the coding/decoding portion 17, the NCU 23, the modem 24, and the like to execute processing as will be described below. Note that, the main control portion 18 also gives an instruction to the reading portion 13 (original reading instruction), for example, when the operation to send the original by facsimile is performed. Note that, it is also possible to select image data to be sent and start sending the image data by facsimile while a preview of the image data stored in the image storage portion 15 is displayed.

The coding/decoding portion 17 reads and decodes image data to be printed, and original determination data and segmentation data corresponding thereto from the image storage portion 15, and gives the decoded data to the image processing portion 16. The image processing portion 16 executes various image processing (hereinafter, referred to as image processing for facsimile sending) to the decoded image data (RGB image data). As will be schematically described below, examples of the image processing for facsimile sending include image quality adjustment processing, spatial filter processing, scaling processing, output tone correction processing, and halftone generation processing. Each of the spatial filter processing and the halftone generation processing may be processing in accordance with various areas indicated by the segmentation data, however, the segmentation data may not be used. Further, in the original reading operation following the facsimile sending, the segmentation processing for the read image data and coding and storage of the segmentation data may not be executed.

As the image quality adjustment processing, the decoded image data is converted into K data using a matrix coefficient. In this case, a matrix coefficient in accordance with an original type indicated by the original determination data may be used. As the spatial filter processing, enhancement processing or smoothing processing is performed to the K data. As the scaling processing, image enlarging processing and image reducing processing in accordance with a sending resolution set by the operation panel 30 or a sending resolution set as default are performed to the K data after the application of the spatial filter processing. As the output tone correction processing, output γ correction processing intended to output to a recording medium such as recording paper at a sending destination, for example, is performed to the K data after the application of the scaling processing. Actually, not output γ correction processing for a device of the sending destination but output γ correction processing for a general device may be performed. As the halftone generation processing, binarization by error diffusion processing, for example, is performed to the K data after the application of the output tone correction processing. In the output tone correction processing or the halftone generation processing, processing in accordance with an original type indicated by the original determination data may be performed.

Description has been given for the facsimile sending of the monochromatic image, but when a color image is sent by facsimile, the image processing portion 16 may perform processing of converting the decoded image data into L*a*b* data for color transmission using a matrix coefficient as the image quality adjustment processing in the above-described image processing for facsimile sending so that the subsequent processing is performed for the L*a*b* data.

The image data after the application of the halftone generation processing is given the rotating processing as the occasion demands is compressed and coded by the coding/decoding portion 17 or a compression format for the facsimile sending, and is temporarily stored in the image storage portion 15. The modem 24 performs sending procedure to a sending destination set through the NCU 23, and at the time when communication with the sending destination is established (at the time ready for sending), the temporarily stored and coded K data is read and sequentially sent to the sending destination through the public network after necessary processing such as changing of the compression format.

In addition, the digital multi-functional peripheral 1 is also capable of sending image data to be sent with additional information added thereto. When sending image data to the outside like in this example, it is also possible to add sending source information (transmission source information) in addition to a stamp, date (date and time), and a page number as the additional information. In this case, the sending source information that is added in sending image data may include any one or more pieces of information of a name of a sender, information of a telephone number of a sending source, and information of an electronic mail address of a sending source. Moreover, information of a sending destination (information of a destination) and the like may be added as the additional information in sending image data.

In the case of the facsimile sending with additional information added, synthesizing processing may be performed as follows. The main control portion 18 reads additional information and information showing an adding position, the main control portion 18 or the image processing portion 16 converts the both pieces of information into image data, and the image processing portion 16 combines the converted image data (image data of additional information) with the image data of the adding destination which is image data subjected to the scaling processing at the above-described adding position. In the digital multi-functional peripheral 1, the position at which the image data of the additional information is added is defined as being settable by a user from the operation panel 30 while the preview display as will be described below is performed. The synthesized image data is processed in the above-described output tone correction processing, rotating processing, and compression processing, etc., and thereafter sent to the sending destination.

<Preview Display Operation for Image Data to be Sent by Facsimile>

The digital multi-functional peripheral 1 is configured so as to be possible to display image data to be sent by facsimile sending or the like for previewing. The preview display operation is performed, for example, when a previous setting or a user operation to execute sending after confirming the image data before sending in advance is performed. Description will be given for the preview display operation for the image data to be sent by facsimile based on the facsimile sending operation for the same image data. In the preview display operation, the main control portion 18 also gives an instruction to the panel control portion 11.

In the preview display operation, the image processing portion 16 may perform the same processing as in the facsimile sending up to the image quality adjustment processing and the spatial filter processing (and the scaling processing), and the preview image generation processing may be executed by the preview image generating portion 16a and the output γ correction processing for displaying the image data may be performed as the output tone correction processing. As the preview image generation processing, the preview image generating portion 16a performs conversion processing in accordance with a pixel number (display resolution) of the touch panel 32 and scaling processing in accordance with a reducing/enlarging ratio in the preview display to the image data after the application of the image enlarging processing and the image reducing processing in accordance with a sending resolution to thereby generate data of the preview image.

Note that, in the preview display operation, the spatial filter processing may not be executed and the halftone generation processing is not executed.

R'G'B' data generated by the preview image generating portion 16a and processed in the output tone correction processing is provided to the touch panel 32. The panel control portion 11 performs control for the touch panel 32 to display an image corresponding to the R'G'B' data in a state of being incorporated in a GUI image to display the GUI image on the touch panel 32.

Description will be given for a preview image that is sent with additional information added thereto. The additional information is output by being added to image data after the application of the scaling processing in accordance with a sending resolution. More specifically, the main control portion 18 reads out an adding position of the additional information and information showing the additional information (or a size of the additional information) and gives them to the image processing portion 16. Subsequently, the preview image generating portion 16a generates R'G'B' data of an existence image showing an existence of the additional information from the additional information (or a size of the additional information) and combines the R'G'B' data with R'G'B' data after the application of the image enlarging processing/ image reducing processing in accordance with a sending resolution at the above-described adding position.

The image data combined with the existence image in this manner is displayed on the touch panel 32 in a state of being incorporated in a GUI image by the panel control portion 11 after the above-described output tone correction processing (output γ correction processing for displaying image data) in the preview display is applied. A user is able to confirm an image displayed for previewing that includes the existence image showing an existence of the additional information and determine whether to directly execute or stop facsimile sending or whether to delete the additional information or execute changing of the adding position (or changing of the additional information) to perform an operation corresponding thereto.

<Sending Operation for Image Data Via Internet>

Next, description will be given for a sending operation when image data of a read original is sent by an electronic mail or internet FAX via the internet. Such image data to be sent via the internet is also sent to sending destination information (electronic mail address in this example) set by the user operation from the touch panel 32 or the key operation portion 31 and stored in the control memory 19.

When the user operation concerning the sending via the internet is received by the operation panel 30, the main control portion 18 gives an instruction to the format converting portion 14, the image storage portion 15, the image processing portion 16, the coding/decoding portion 17, the LAN control portion 21, and the like to execute sending processing via the internet as will be described below. Note that, the main control portion 18 also gives an instruction to the reading portion 13 (original reading instruction), for example, when an operation to send an original via the internet is performed.

The coding/decoding portion 17 reads and decodes image data to be printed and original determination data and segmentation data corresponding thereto from the image storage portion 15, and gives the decoded data to the image processing portion 16. The image processing portion 16 executes various image processing (hereinafter, referred to as image processing for internet sending) to the decoded image data (RGB image data). Examples of the image processing for internet sending include the image quality adjustment processing, the spatial filter processing, the scaling processing, the output tone correction processing, and the halftone generation processing, which have been described in the image processing for facsimile sending.

Moreover, the image processing in the case of color image sending is also the same as the image processing for facsimile sending, and in the image processing for internet sending, the image processing portion 16 may perform processing of converting the decoded image data into L*a*b* data for color transmission using a matrix coefficient as the image quality adjustment processing so that the subsequent processing is performed for the L*a*b* data.

The coding/decoding portion 17 codes (compresses) the image data after the application of the image processing for internet sending to obtain compressed files. The compression is performed in the unit of a single page of the original. Subsequently, the format converting portion 14 converts the compressed files into a single file and the file is attached to a multipart mail according to MIME (Multipurpose Internet Mail Extension), for example. By the processing so far, the read image data is converted into a format of an electronic mail. The electronic mail is sent to a sending destination via the internet using a mail transfer protocol such as an SMTP (Simple Mail Transfer Protocol) through a LAN interface by the LAN control portion 21.

In the case of the internet facsimile sending, the coding/decoding portion 17 may perform the compression in a compression format only for facsimile such as MH, for example, and the format converting portion 14 may convert the obtained compressed files in the unit of a page, for example, into a single TIFF file. In the case of sending just by attaching to the electronic mail as an attached file (in the case of sending by so-called scan to e-mail), the coding/decoding portion 17 may perform the compression in a compression format such as JPEG, for example, and the format converting portion 14 may convert the obtained compressed files in the unit of a page into a single PDF file, for example.

In addition, even when image data to be sent is image data sent via the internet, the digital multi-functional peripheral 1 is capable of sending the image data with additional information added thereto in the same manner as the case of the facsimile sending image data. As the additional information adding processing, the synthesizing processing described in the facsimile sending may be executed, and the image data is processed in the output tone correction processing, the compression processing, the format conversion processing, and the like described above and thereafter sent to an address of a sending destination as an electronic mail.

<Preview Display Operation for Image Data to be Sent Via Internet>

As mentioned in the description for the preview display in the facsimile sending, the digital multi-functional peripheral 1 of the present invention is capable of being configured so that a preview of image data to be sent via the internet is also able to be displayed on the touch panel 32.

In the preview display operation, similarly in the description for the preview display in the facsimile sending, the image processing portion 16 performs the same processing as in the image processing for internet sending up to the image quality adjustment processing and the spatial filter processing (and the scaling processing), and the preview image generation processing is executed by the preview image generating portion 16a, and the output γ correction processing for displaying the image data is performed as the output tone correction processing. R'G'B' data generated by the preview image generating portion 16a and processed in the output tone correction processing is provided to the touch panel 32 and is displayed on the touch panel 32 in a state of being incorporated in a GUI image by the panel control portion 11. The description for the preview display in the facsimile sending may be also quoted for addition of an existence image.

<Description for Preview Display Before Outputting (Sending or Printing) Image Data According to the Present Invention>

As described for the preview display operation before printing in copying and receiving by facsimile, and for the preview display operation in facsimile sending and sending image data via internet, the digital multi-functional peripheral 1 according to the present invention has the preview image generating portion 16a that reads image data to be output from the image storage portion 15 and generates a preview image thereof. The preview image generated by the preview image generating portion 16a is sent to the touch panel 32 by the control from the main control portion 18, controlled to be displayed in a state of being incorporated in a GUI image by the panel control portion 11, and displayed on the touch panel 32. In this manner, the touch panel 32 is an example of an image display portion that displays a preview of the image data to be output.

The image data to be output may be image data input from any of a scanner apparatus illustrated as the reading portion 13, an attachable/detachable storage apparatus illustrated as the USB memory connected to the USB I/F 25, and a communication line illustrated as the LAN or the line. The image data to be output may also be image data read from a storage apparatus illustrated as the image storage portion 15 provided in the digital multi-functional peripheral 1.

As described above, the digital multi-functional peripheral 1 according to the present invention is also capable of outputting image data to be output with additional information added thereto. Further, as described above, in the digital multi-functional peripheral 1 of the present invention, the panel control portion 11 performs control to display an existence image showing an existence of additional information instead of the additional information on the touch panel 32 based on the control from the main control portion 18. Thus, the preview image generating portion 16a generates such an existence image, and generates a preview image with the existence image by combining the generated existence image with the preview image generated from the image data to be output. In this manner, each of the preview image generating portion 16a and the panel control portion 11 is one example of a display control portion that performs control to display the existence image in the preview display for the image display portion.

Such a configuration of the present invention makes it possible to visually identify whether or not additional information is added to image data to be output on a screen in which a preview of the image data to be output is displayed easily. That is, according to the present invention, even when additional information such as a stamp, date, and a page number is added to image data in outputting, it is possible to easily confirm and adjust a position relation between the additional information and the image data on a preview display screen. In addition, by providing a setting portion for performing a user setting of a display color of the existence image with a GUI image or the like in the digital multi-functional peripheral 1, it is possible to display in a color visually identified by a user easily. Moreover, the existence image may be displayed not only in the color but in diagonal line such as hatching or in a dot pattern, or may be displayed with a display part blinked so that the existence is easily recognized by a user. These display methods may be provided so as to be settable in the setting portion.

Note that, the present invention basically displays an existence image instead of additional information in a preview display but may be configured so that an image showing additional information itself is able to be synthesized at an adding position together.

<Specific Example of Preview Display>

Referring to FIGS. 4 to 27B, description will hereinafter be given for an existence image of additional information added to image data to be output and for the flow of a preview display thereof, with specific examples thereof. Printing in a copy will hereinafter be mainly taken as an example, which is the same as in printing in facsimile reception, printing of image data read from a USB memory or the like, facsimile sending, internet FAX and the like as described above.

Figure 4:
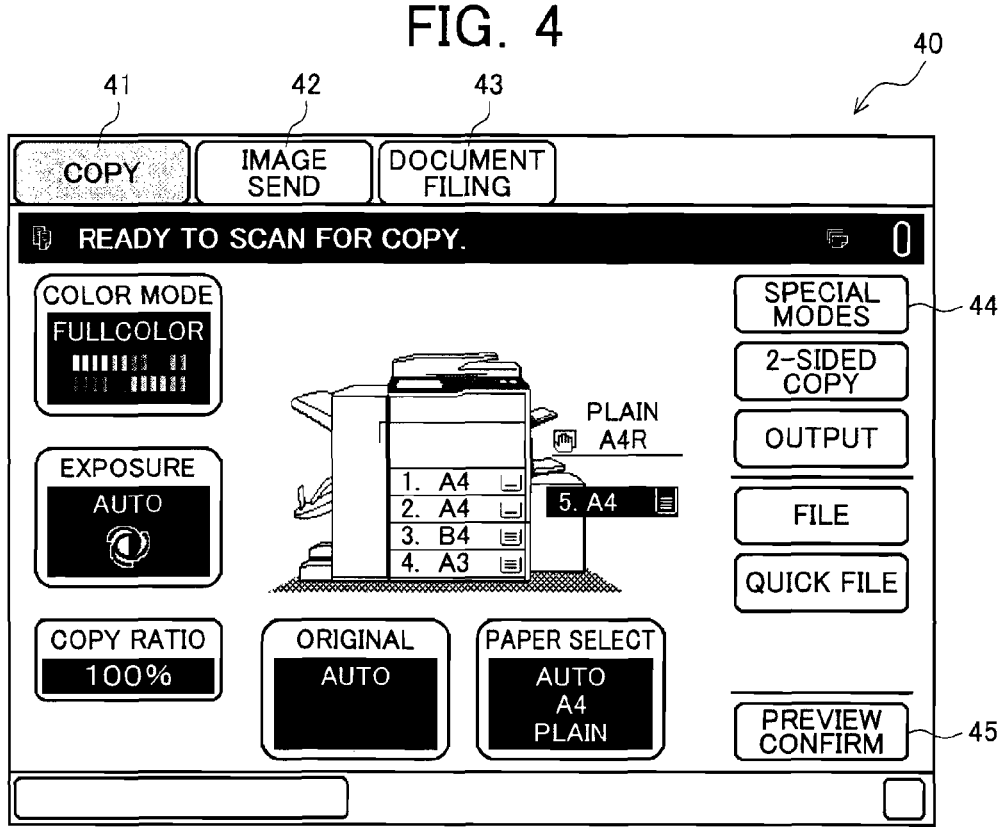
FIG. 4 is a diagram for showing an example of a standard screen of the digital multi-functional peripheral explained in FIGS. 2 and 3.

FIG. 4 is a diagram for showing an example of a standard screen of the digital multi-functional peripheral explained in FIGS. 2 and 3. FIG. 4 shows an example of a GUI image (referred to as a GUI image 40) displayed on the touch panel 32 in the digital multi-functional peripheral 1 as the standard screen. The GUI image 40 of the standard screen is displayed on the touch panel 32 when a power source of the digital multi-functional peripheral 1 is turned on or reset. In the GUI image 40, a copy mode selection key 41, an image send mode selection key 42, and a document filing mode selection key 43 are displayed to select an operation mode of the digital multi-functional peripheral 1, and the GUI image 40 shows a state where the copy mode is selected.

In the copy mode, various condition settings are possible to perform a copy. For example, a 2-sided copy key for performing a setting of 1-sided/2-sided copy, an output key for performing a setting of post processing such as punch or staple, a special modes key 44 for performing other detailed settings in copying, a preview confirm key 45 for confirming a finish state of an image read by a scanner, an image input from an external device, or an image stored in a storage apparatus such as HDD, and the like are provided. A user is able to display a preview of image data by operating the preview confirm key 45 using the touch panel 32. Note that, the key 42 or the key 43 is selected to shift to an image send mode or a document filing mode, where a GUI image for setting in each mode is displayed so that various settings in accordance with each mode are able to be performed.

Figure 5:
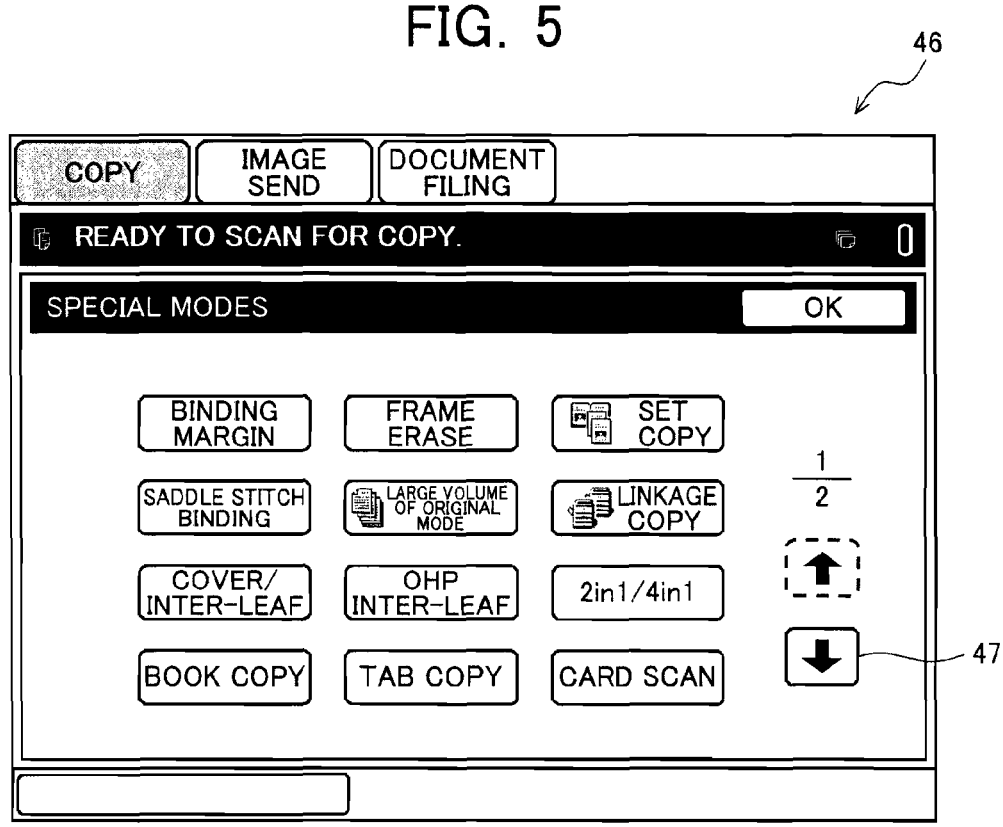
FIG. 5 is a diagram for showing an example of a GUI image that is displayed when a special modes key for performing a detailed setting in a copy is selected in a GUI image of FIG. 4.
Figure 6:
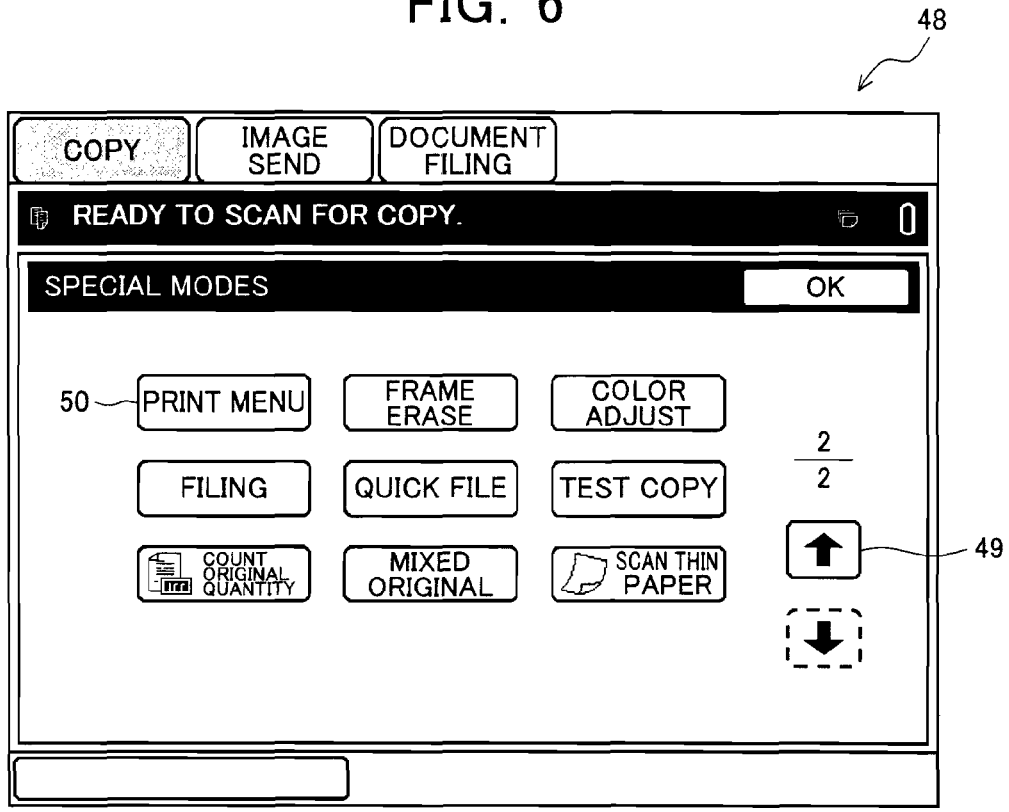
FIG. 6 is a diagram for showing an example of a GUI image that is displayed when an arrow key is selected in the GUI image of FIG. 5.

FIG. 5 is a diagram for showing an example of a GUI image that is displayed when the special modes key for performing a detailed setting in a copy is selected in the GUI image of FIG. 4, and FIG. 6 is a diagram for showing an example of a GUI image that is displayed when an arrow key is selected in the GUI image of FIG. 5. Note that, although individual description will be omitted, the following figures including FIGS. 5 and 6 display an OK key and a cancel key, and after the OK key is depressed, a setting thereof is saved to return to a previous screen, and after the cancel key is depressed, a setting thereof is discarded to return to a previous screen.

In a GUI image 46 shown in FIG. 5, various setting items such as binding margin and saddle stitch binding are displayed so as to be selectable as well as an arrow key 47 is displayed because there are a lot of setting items. When the arrow key 47 is selected, other setting items are displayed so as to be selectable like in a GUI image 48 of FIG. 6. In the GUI image 48, a print menu key 50 and the like are displayed so as to be selectable as other setting items and an arrow key 49 for returning to the GUI image 46 is also displayed.

Figure 7:
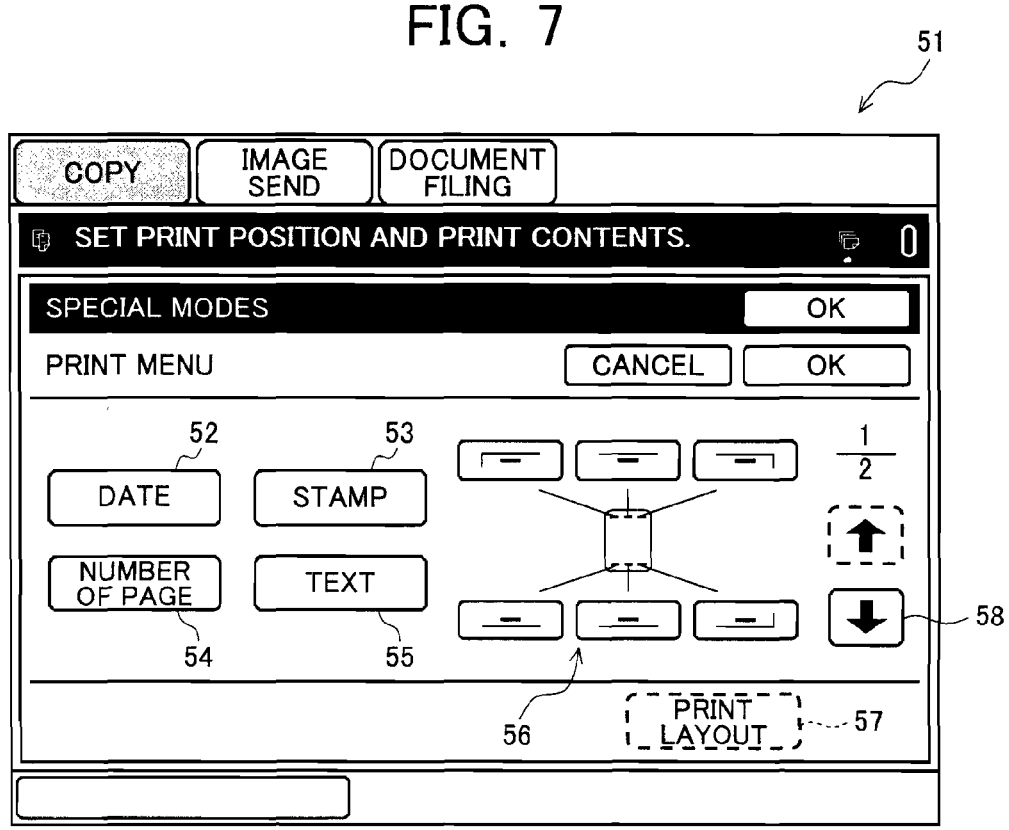
FIG. 7 is a diagram for showing an example of a GUI image that is displayed when a print menu key is selected in the GUI image of FIG. 6.
Figure 8:
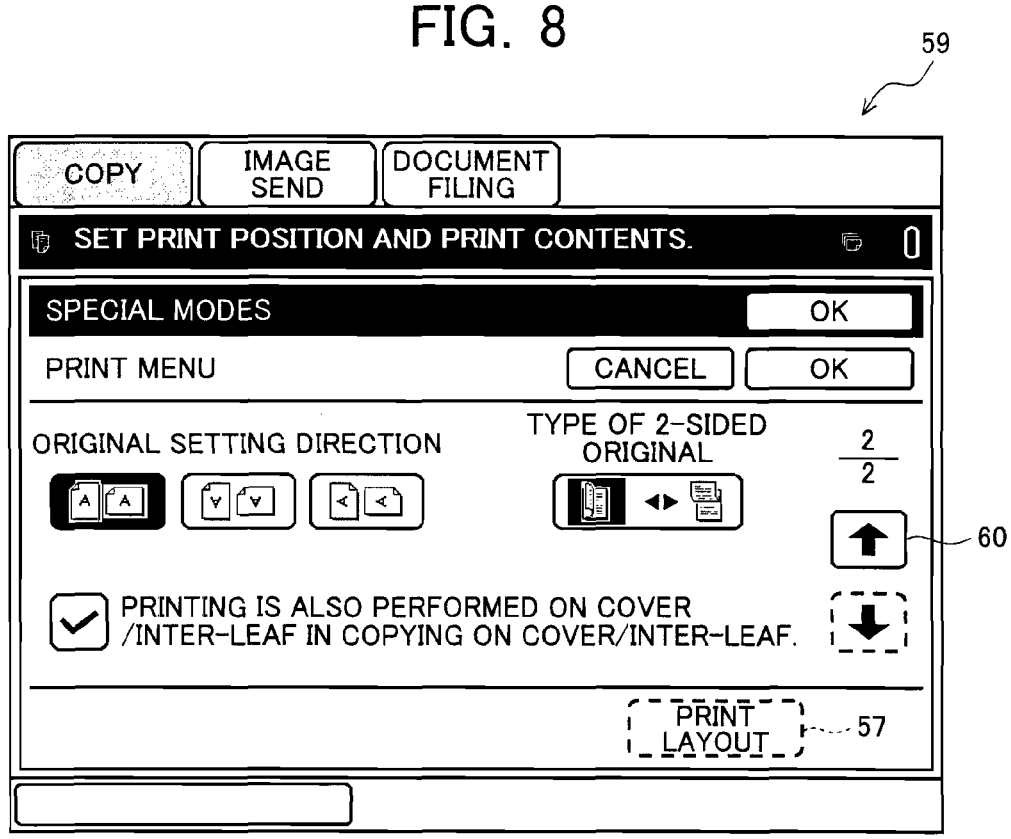
FIG. 8 is a diagram for showing an example of a GUI image that is displayed when an arrow key is selected in the GUI image of FIG. 7.

FIG. 7 is a diagram for showing an example of a GUI image that is displayed when the print menu key is selected in the GUI image of FIG. 6, and FIG. 8 is a diagram for showing an example of a GUI image that is displayed when an arrow key is selected in the GUI image of FIG. 7. A GUI image 51 shown in FIG. 7 is displayed when the print menu key 50 of FIG. 6 is selected so that a setting of contents of additional information to be added in printing becomes possible.

In the GUI image 51 shown in FIG. 7, a date key 52, a stamp key 53, the number of page key 54, and a text key 55 are displayed so as to be selectable. The date key 52 is a key for inputting and setting date, the stamp key 53 is a key for setting a fixed stamp such as "IMPORTANT" and "TOP SECRET", the number of page key 54 is a key for setting a page number to be printed on recording paper, and the text key 55 is a key for inputting text desired by a user as additional information.

Moreover, an image displayed on the right side of these four keys 52 to 55 is an additional information confirmation image 56 for confirming where (left in the upper part, center in the upper part, right in the upper part, left in the lower part, center in the lower part, or right in the lower part) or whether each additional information of "date", "stamp", "number of page", and "text" is set. The additional information confirmation image 56 in FIG. 7 shows a state where no additional information is set at any position. Since the GUI image 51 shows a state where no additional information is set at all, a print layout key 57, which will be described below, is also displayed so as to be not selectable. An additional information confirmation image after setting additional information will be described below with reference to FIG. 9 and the like.

Since there are a lot of setting items related to additional information in the GUI image 51 shown in FIG. 7, an arrow key 58 is also displayed. When the arrow key 58 is selected, other setting items are displayed like in a GUI image 59 of FIG. 8. In the GUI image 48, an original setting direction (portrait/landscape), a type of a 2-sided original (laterally-opened 2-sided original/longitudinally-opened 2-sided original), presence/absence of stamp print on inter-leaf, and the like are displayed so as to be settable as other setting items as well as an arrow key 60 for returning to the GUI image 51 is also displayed.

Figure 9:
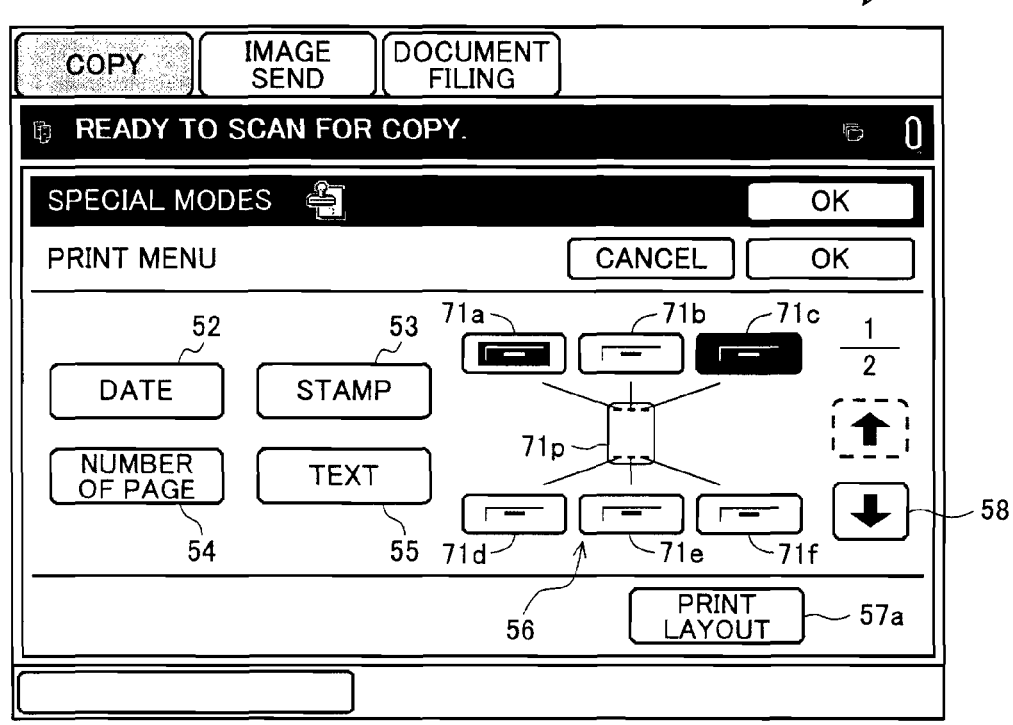
FIG. 9 is a diagram for showing another example of a GUI image that is displayed when the print menu key is selected in the GUI image of FIG. 6.

FIG. 9 is a diagram for showing another example of a GUI image that is displayed when the print menu key is selected in the GUI image of FIG. 6, which shows an example of a GUI image when additional information is set. In a GUI image 70 shown in FIG. 9, an additional information confirmation image 56 serves as an image showing a state where additional information is set, differently from that of FIG. 7. To describe more specifically, it displays so that each of adding positions in an image corresponding to recording paper (recording paper image) 71p is shown and displays state presentation images 71a to 71f for showing a setting state in association with each of the adding positions. The adding positions in the image 71p include left in the upper part (stage), center in the upper part, right in the upper part, left in the lower part (stage), center in the lower part, and right in the lower part. In addition, FIG. 9 shows a state where additional information is set to at least one of the images 71a to 71f (left side in the upper part shown by the image 71a in this example). Moreover, a print layout key 57a is also displayed so as to be selectable in the GUI image 70.

Description will be given for a method for discriminating a setting state in the state presentation images 71a to 71f illustrated in FIG. 9. Printing positions where a print menu is not set yet and not selected yet are displayed in not-reverse like the state presentation images 71b, 71d, 71e, and 71f. A currently selected printing position is displayed in full reverse like the state presentation image 71c. A printing position where other print menus have been already set is displayed so that only an inner part of the key is displayed in reverse like the state presentation image 71a. When a position where print contents are not set is selected, the selected position is displayed in full reverse, and the previously selected key is displayed in not-reverse when a print setting is not performed, and is displayed so that an inner part thereof is displayed in reverse when a print setting is performed.

Next, procedure for setting an adding position of additional information will be described. Although description will be given assuming that any of the state presentation images 71*a* to 71*f* in the GUI image 70 of FIG. 9 is selected, the same is also applied by selecting any of state presentation images of the additional information confirmation image 56 in the GUI image of FIG. 7.

First, by selecting any of the keys 52 to 55 in a state of the full-reversed display like the state presentation image 71*c* to set print contents, the print contents are able to be allocated to the position. In addition, by selecting a cancel key in a state of the full-reverse display like the state presentation image 71*c*, additional information at the position is able to be deleted. By selecting any of the keys 52 to 55 or the cancel key in a state where an already-set print position is selected to set print contents, the print contents are also able to be changed or deleted at the position. Here, description has been given assuming that an adding position is set and thereafter contents of additional information to be added to the adding position are set by each of the keys 52 to 55, contents of additional information may be firstly set by each of the keys 52 to 55 to select an adding position thereof from the state presentation images 71*a* to 71*f*.

Moreover, it is preferable to inhibit that two or more of date, a number of page, the same fixed stamp, the same kind of fixed stamp, and a contradictory kind of fixed stamp are added at the same time regardless of being added to which area of six adding areas shown by the state presentation images 71*a* to 71*f*. Examples of the same kind of fixed stamp include "TEMPORARY ISSUE" or "TEMPORARY". However, a stamp in English and a stamp in Japanese as a translation thereof may be allowed to be added at the same time even if being in the same kind. Examples of the contradictory kind of fixed stamp include "TOP SECRET" and "CIRCULAR". In addition, regardless of the contradictory kind, in the case of a combination of fixed stamps to which limitation is desirably put so that simultaneous printing thereof is inhibited, such inhibition is possible.

Such limitation of addition will be described with examples. For example, a plurality pieces of additional information of a page number are not generally provided in the same page. Accordingly, for example, when an operation to put additional information of a page number to upper left of the page is further received after additional information of the same page number was put to a lower center (center of the lower part) of a page, processing may be performed as follows. That is, it is possible to display a message to the effect that "the page number has been already added and set to another position" as a pop-up image or the like, and not to receive the setting and to display a message indicating such a state together or to automatically delete the page number at the above-described another position and display a message indicating such a state together. Alternatively, it is possible to display a message to the effect that "the page number has been already added and set to another position" together with a message for inquiring whether or not a user intends to move the additional information and wait for an operation from the user. When an operation of moving (selection of the OK key displayed at the same time, for example) is performed by the user, print contents are moved to the selected adding position, and when an operation of not moving (selection of the cancel key displayed at the same time, for example) is performed, a pop-up image showing the message is closed.

Such a consideration is applicable not only to a page number but also to, for example, date and a fixed stamp such as confidential. Note that, on the contrary, since there is also assumed a case where a plurality of fixed stamps, only if they are important (such as "URGENT", for example), are desirably allowed to be added at the same time to be emphasized on printed paper, a combination to be inhibited is preferably settable by a user.

Moreover, the same fixed stamps and the like may be inhibited from being added only to the same adding area of the six adding areas shown by the state presentation images 71*a* to 71*f*. For example, when any of the keys 52 to 55 is selected in a state where any of the state presentation images 71*a* to 71*f* is selected, if additional information corresponding to the selected key has been already set to an adding position corresponding to the selected state presentation image, a message to the effect that print contents have been already set to the position may be displayed as a pop-up image. In addition, it is possible not to receive the setting and display a message indicating such a state together or to automatically delete and move the additional information at the already-set position, and display a message indicating such a state together. It is also possible to display the message to the effect that print contents have been already set together with a message for inquiring whether or not intending to move the additional information and wait for a user operation in the same manner as the processing of the limitation of addition regardless of an adding area.

In addition, a default position of an adding position of a page number may be set to the center in the lower part (which is any of lowermost part, center, and uppermost part of the center in the lower part), and in such a case, by selecting the number of page key 54 in a state where no state presentation images 71*a* to 71*f* are selected, the adding position is automatically set to the center in the lower part. In addition, a default position of an adding position of date may be set to right in the upper part (which is any of uppermost part, center, and lowermost part of the right in the upper part), and in such a case, just by selecting the date key 52 in a state where no state presentation images 71*a* to 71*f* are selected, the adding position is automatically set to the right in the upper part. Similarly, a default of adding positions of a fixed stamp and text may be set to left in the upper part (which is any of lowermost part, center, and uppermost part of the left in the upper part and is different between the fixed stamp and the text). In this manner, by setting a position which is used most frequently as a default position depending on a type of additional information, it is possible to improve convenience for a user.

Note that, even when any of the keys 52 to 55 is selected in a state where no state presentation images 71*a* to 71*d* are selected, it is possible to assume a case where additional information corresponding to the selected key has been already set and a case where additional information that is limited so that combining with the additional information is impossible has been already set to an adding position thereof. Also in such cases, a message to the effect that print contents have been already set to the position may be displayed as a pop-up image. Processing in this case is also the same as the processing of the limitation of addition regardless of an adding area.

Figure 10:
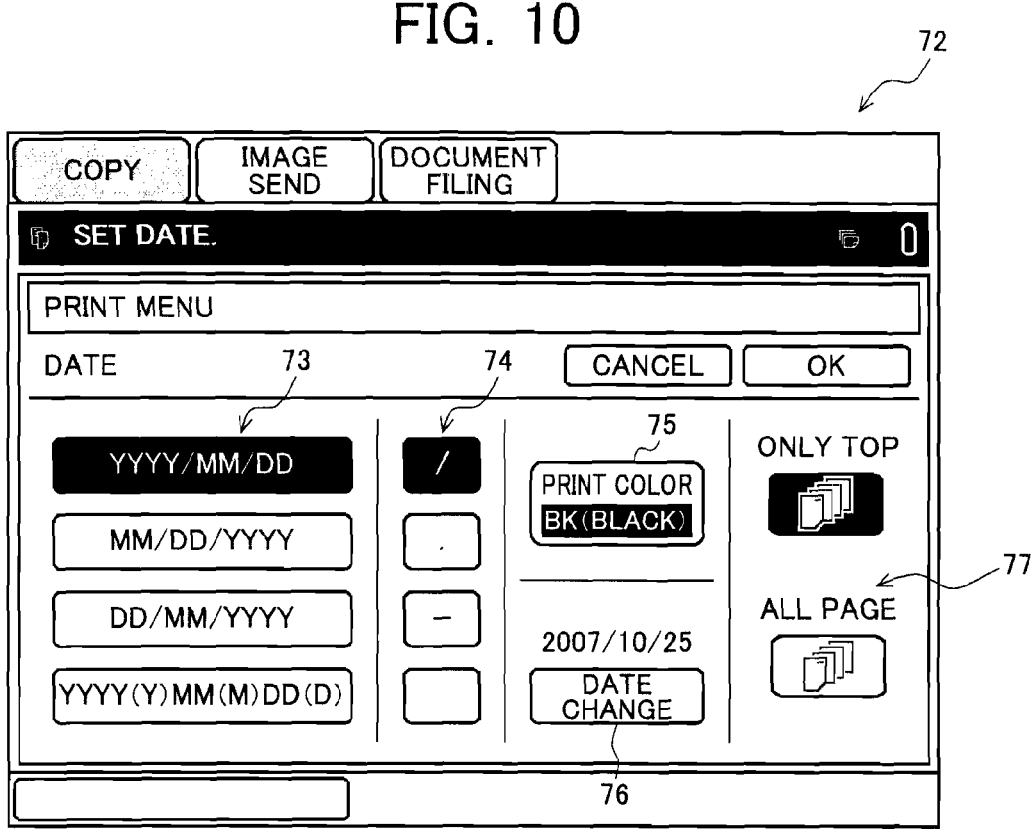
FIG. 10 is a diagram for showing an example of a GUI image that is displayed when a date key is selected in the GUI image of FIG. 7 or 9.
Figure 11:
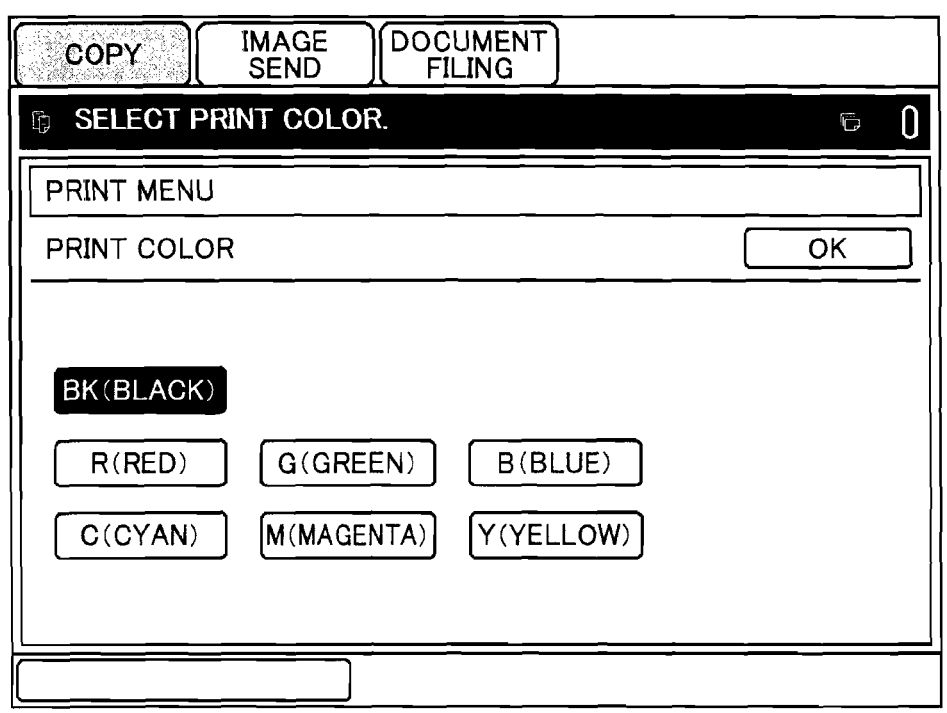
FIG. 11 is a diagram for showing an example of a GUI image that is displayed when a print color key is selected in the GUI image of FIG. 10.
Figure 12:
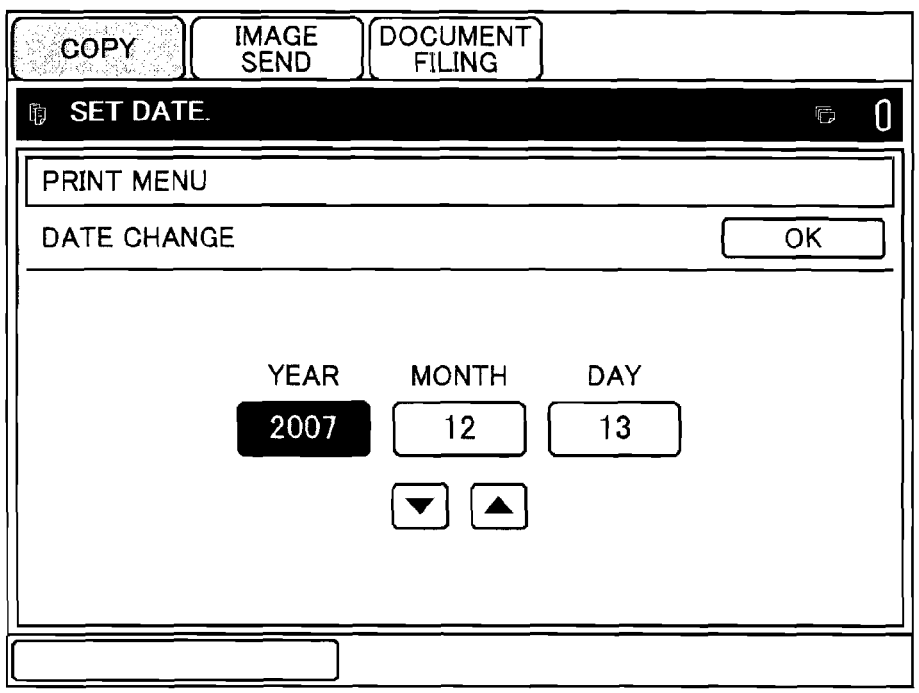
FIG. 12 is a diagram for showing an example of a GUI image that is displayed when a date change key is selected in the GUI image of FIG. 10.

FIG. 10 is a diagram for showing an example of a GUI image that is displayed when the date key is selected in the GUI image of FIG. 7 or 9. FIG. 11 is a diagram for showing an example of a GUI image that is displayed when a print color key is selected in the GUI image of FIG. 10, and FIG. 12 is a diagram for showing an example of a GUI image that is displayed when a date change key is selected in the GUI image of FIG. 10.

A GUI image 72 shown in FIG. 10 is displayed when the date key 52 is selected in the GUI image 51 of FIG. 7 or the GUI image 70 of FIG. 9. In the GUI image 72, formats of date to be displayed are displayed so as to be selectable from four types of formats 73 and separation marks of date 74 are also displayed so as to be selectable. In the GUI image 72, a print color key 75 for selecting a print color, a date change key 76 for inputting arbitrary date to change date, and an applying page selection key 77 for setting that date is applied to either a top page or all pages are further displayed so as to be selectable. The print color key 75 is selected to shift to a GUI image 78 of FIG. 11 so that a color is able to be set. In addition, the date change key 76 is selected to shift to a GUI image 79 of FIG. 12 so that date is able to be set.

Figure 13:
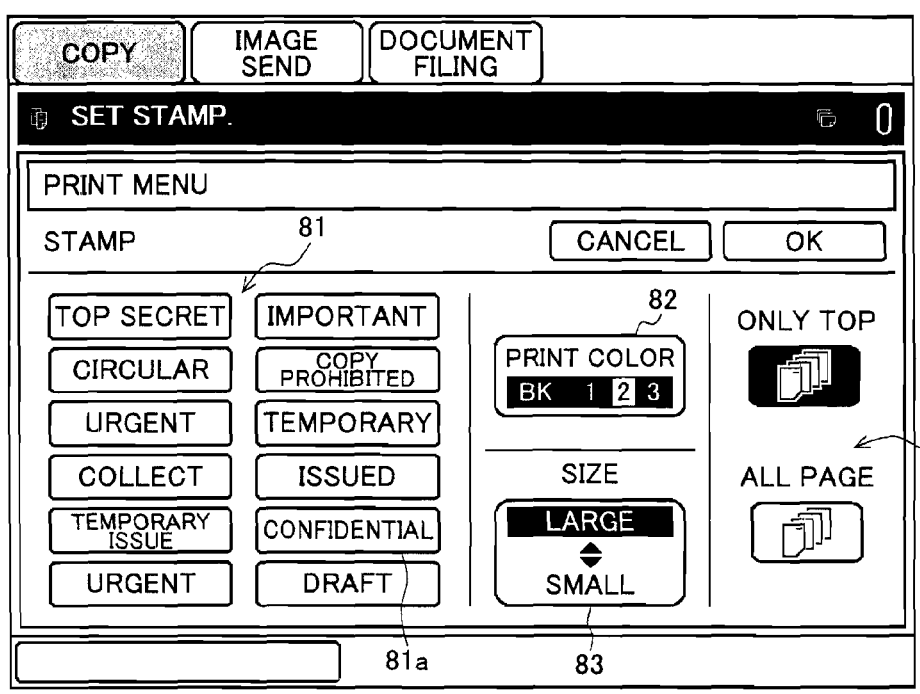
FIG. 13 is a diagram for showing an example of a GUI image that is displayed when a stamp key is selected in the GUI image of FIG. 7 or 9.
Figure 14:
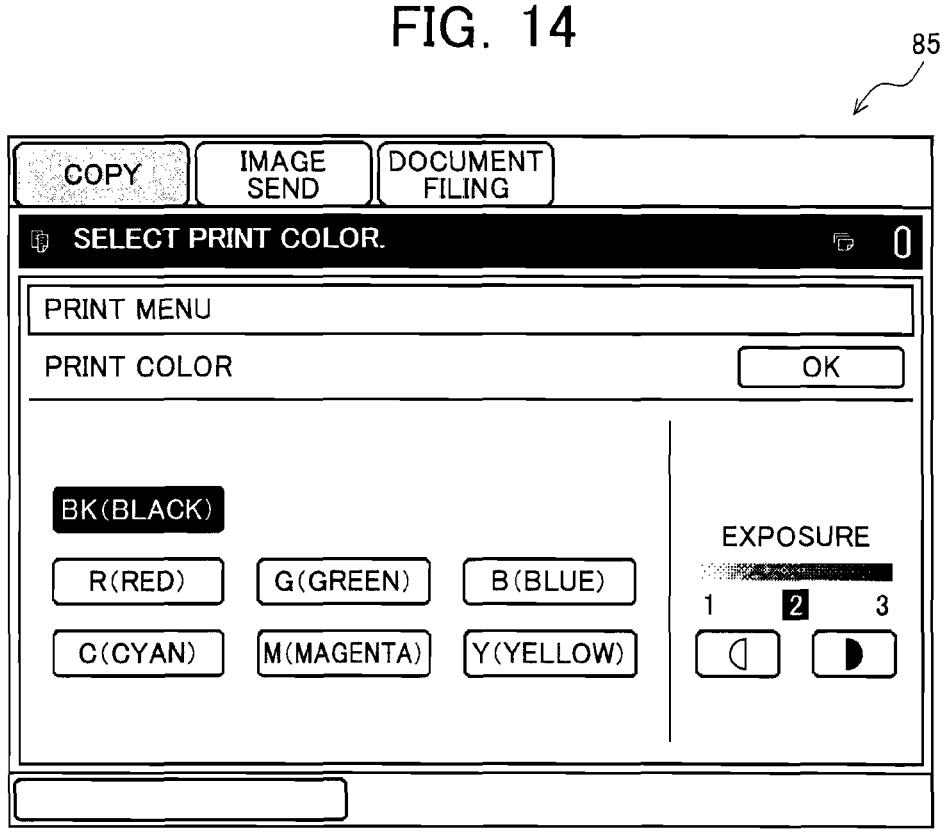
FIG. 14 is a diagram for showing an example of a GUI image that is displayed when a print color key is selected in the GUI image of FIG. 13.

FIG. 13 is a diagram for showing an example of a GUI image that is displayed when the stamp key is selected in the GUI image of FIG. 7 or 9, and FIG. 14 is a diagram for showing an example of a GUI image that is displayed when the print color key is selected in the GUI image of FIG. 13.

A GUI image 80 shown in FIG. 13 is displayed when the stamp key 53 is selected in the GUI image 51 of FIG. 7 or the GUI image 70 of FIG. 9. In the GUI image 80, keys 81 each corresponding to "TOP SECRET", "CIRCULAR", "URGENT", "COLLECT", "TEMPORARILY ISSUED", "URGENT", "IMPORTANT", "COPY PROHIBITED", "TEMPORARY", "ISSUED", "CONFIDENTIAL", and "DRAFT" are displayed as fixed stamps so as to be selectable. By selecting any of the keys 81, a fixed stamp text to be set is able to be set. For example, by selecting the CONFIDENTIAL key 81a, a stamp text of "CONFIDENTIAL" is able to be set. In the GUI image 80, a print color key 82 for selecting a print color and a print density, a size key 83 for selecting a print size, an applying page selection key 84 for setting that the fixed stamp is applied to either a top page or all pages are displayed so as to be selectable. For example, the print color key 82 is selected to shift to a GUI image 85 of FIG. 14 so that a color and a density are able to be set.

Figure 15:
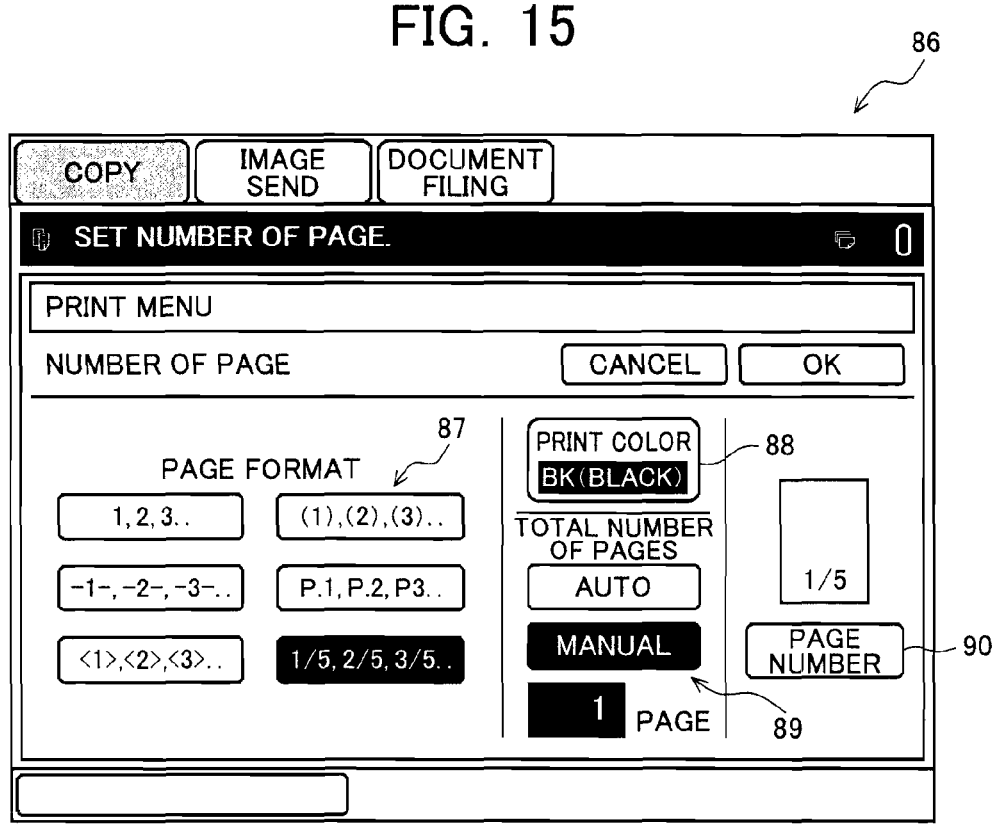
FIG. 15 is a diagram for showing an example of a GUI image that is displayed when a number of page key is selected in the GUI image of FIG. 7 or 9.
Figure 16:
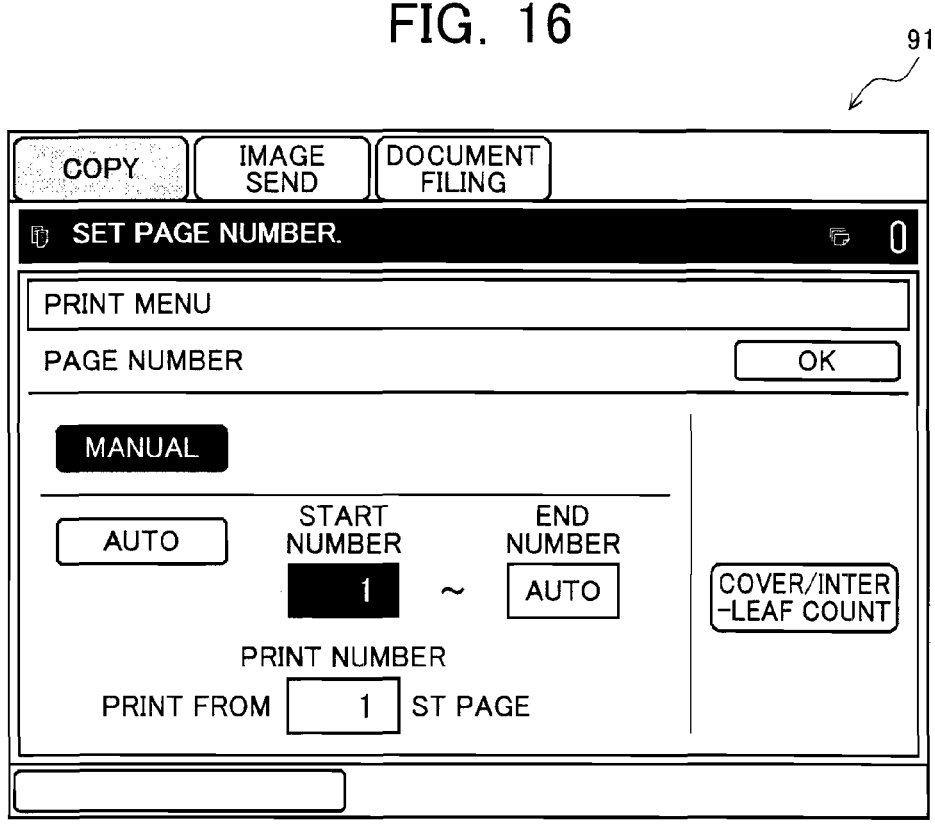
FIG. 16 is a diagram for showing an example of a GUI image that is displayed when a page number key is selected in the GUI image of FIG. 15.

FIG. 15 is a diagram for showing an example of a GUI image that is displayed when the number of page key is selected in the GUI image of FIG. 7 or 9, and FIG. 16 is a diagram for showing an example of a GUI image that is displayed when a page number key is selected in the GUI image of FIG. 15.

A GUI image 86 shown in FIG. 15 is displayed when the number of page key 54 is selected in the GUI image 51 of FIG. 7 or the GUI image 70 of FIG. 9. In the GUI image 86, formats of a page to be printed are displayed so as to be selectable from six types of formats 87. In the GUI image 86, a print color key 88 for selecting a color for printing a page number, a total number of pages key 89 for setting the number of pages to print a page number, and a page number key 90 for setting a page number to be printed arbitrarily are displayed so as to be selectable.

The print color key 88 is selected to shift to the GUI image 78 of FIG. 11 so that a print color of a page number is able to be set. In the total number of pages key 89, by selecting an auto key, a page number matching to the number of sheets of read originals is added, and by selecting a manual key, the total number of pages from 1 to 999 is able to be manually input from a ten key. When the page number key 90 is selected to shift to a GUI image 91 of FIG. 16 so that a page number to be applied is able to be set arbitrarily. In the GUI image 91, by selecting an auto key, a page number is able to be automatically given, and by selecting a manual key, a start number of a page number and a print start page are able to be set. Further, in the GUI image 91, a cover/inter-leaf count key for setting whether or not to give a page number to a cover or inter-leaf in giving a page number is also displayed so as to be selectable. The cover/inter-leaf count key is selected to shift to a not-shown GUI image so that whether to print a page number on each of "cover", "inter-leaf", and "back cover" is able to be set. This makes it possible to set whether to print a page number on any one of or a plurality of "cover", "inter-leaf", and "back cover" or not to print a page number on any of them.

Figure 17:
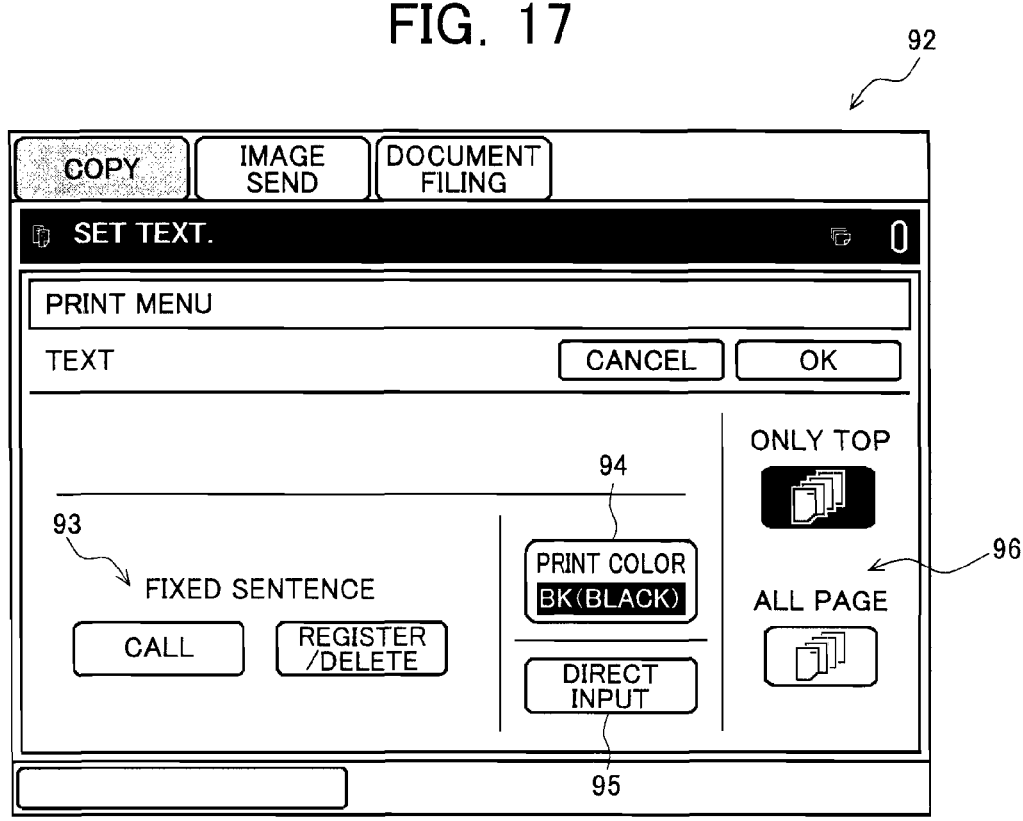
FIG. 17 is a diagram for showing an example of a GUI image that is displayed when a text key is selected in the GUI image of FIG. 7 or 9.
Figure 18:
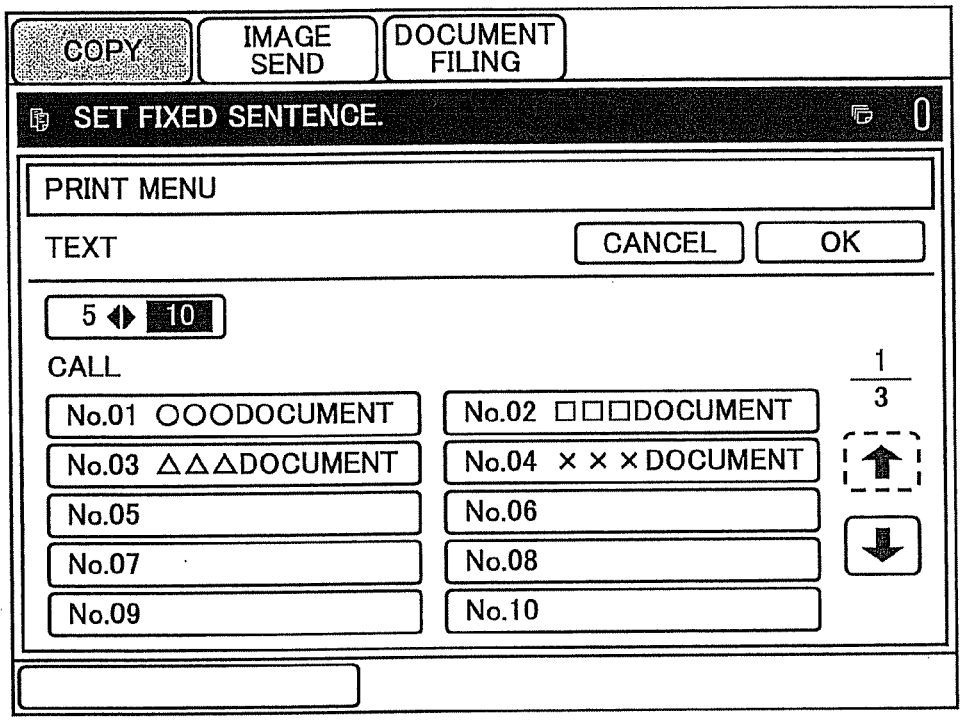
FIG. 18 is a diagram for showing an example of a GUI image that is displayed when a call key of a fixed sentence key is selected in the GUI image of FIG. 17.
Figure 19:
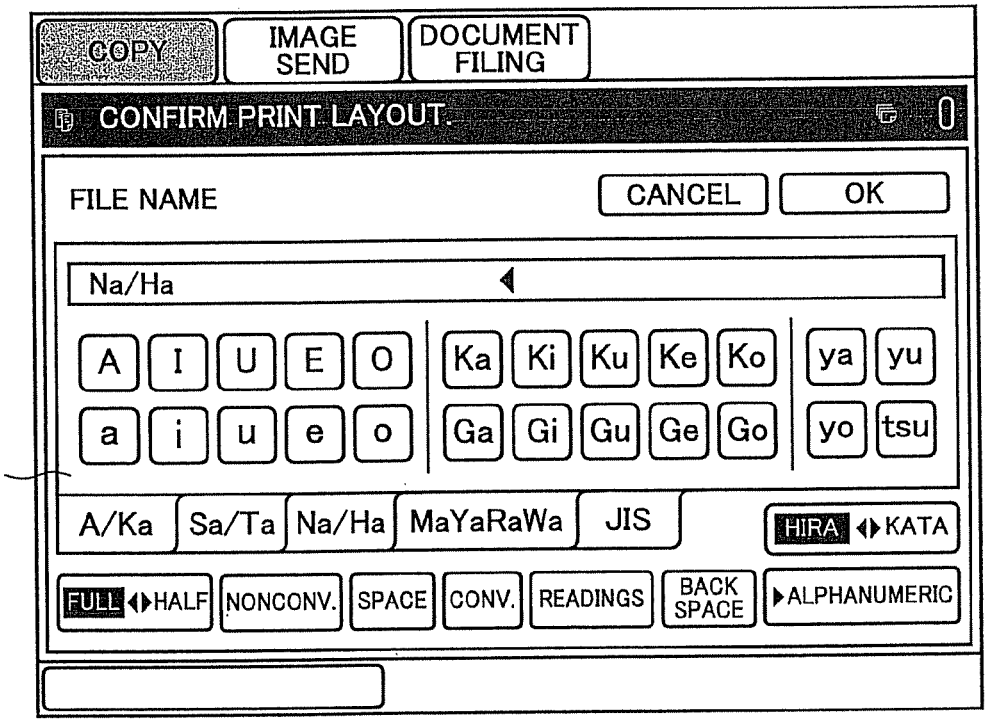
FIG. 19 is a diagram for showing an example of a GUI image that is displayed when a direct input key is selected in the GUI image of FIG. 17.

FIG. 17 is a diagram for showing an example of a GUI image that is displayed when the text key is selected in the GUI image of FIG. 7 or 9. FIG. 18 is a diagram for showing an example of a GUI image that is displayed when a call key of a fixed sentence key is selected in the GUI image of FIG. 17, and FIG. 19 is a diagram for showing an example of a GUI image that is displayed when a direct input key is selected in the GUI image of FIG. 17.

A GUI image 92 shown in FIG. 17 is displayed when the text key 55 is selected in the GUI image 51 of FIG. 7 or the GUI image 70 of FIG. 9. In the GUI image 92, a fixed sentence key 93 including a call key and a register/delete key is displayed so as to be selectable. Fixed sentences previously registered by a user are read out using the call key of the fixed sentence key 93 and a list of them can be displayed like GUI image 97 of FIG. 18. In addition, it is possible to read out fixed sentences previously registered by a user using the register/delete key of the fixed sentence key 93 in the same manner and display a list of them in a GUI image and execute edition and deletion by selecting the object. With the register/delete key, it is possible that, after displaying a list in the same manner, a GUI image 98 of FIG. 19 is displayed to directly input and register a new fixed sentence.

In the GUI image 92, a print color key 94 for selecting a color for printing text, a direct input key 95 for directly inputting text, and a giving page selection key 96 for setting that the text is given to either a top page or all pages are displayed so as to be selectable. The print color key 94 is selected to shift to the GUI image 78 of FIG. 11 so that a color is able to be set. The direct input key 95 is selected to shift to the GUI image 98 of FIG. 19 so that text desired by a user, such as in Japanese, English, and Chinese, is able to be input arbitrarily using a displayed keyboard image 99.

As described above, in the digital multi-functional peripheral 1, by selecting the keys 52 to 55 and the state presentation images in the GUI image 51 of FIG. 7 or the GUI image 70 of FIG. 9, it is possible to set contents of additional information and an adding position thereof. In the digital multi-functional peripheral 1, it is also possible to confirm contents of each additional information and adding positions thereof as the entire image by selecting the print layout key 57a of the GUI image 70.

Figure 20:
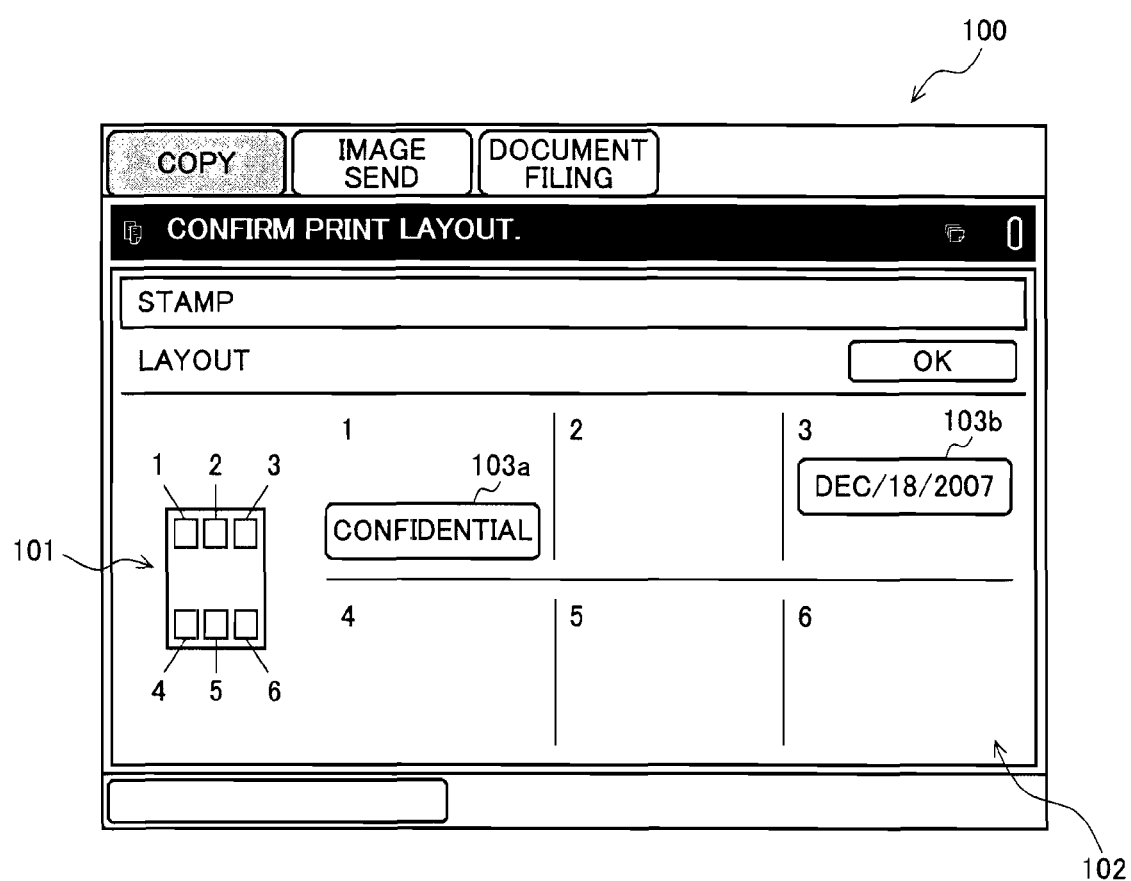
FIG. 20 is a diagram for showing an example of a GUI image that is displayed when a print layout key is selected in the GUI image of FIG. 9.

FIG. 20 is a diagram for showing an example of a GUI image that is displayed when the print layout key is selected in the GUI image of FIG. 9. A GUI image 100 shown in FIG. 20 is displayed when the print layout key 57a is selected in the GUI image 70 of FIG. 9. Note that, the print layout key 57a is displayed in a gray-out manner so as to be not selectable in an initial screen like the GUI image 51 of FIG. 7 as described above, and becomes selectable when any of additional information of "date", "stamp", "number of page", and "text" is set to any position (left in the upper part, center in the upper part, right in the upper part, left in the lower part, center in the lower part, or right in the lower part) of recording paper. Here, description has been given assuming that the layout is able to be changed based on conditions that at least one content of additional information is set, however, it may be configured so that, even when no content of additional information is set, the print layout key 57 of FIG. 7 is also displayed so as to be selectable, and the key 57 is selected to shift to the similar GUI image 100 so that a position at which additional information is to be added is set first.

In the GUI image 100 shown in FIG. 20, an image corresponding to recording paper (recording paper image) 101 is displayed so as to show each of adding positions (left in the upper part, center in the upper part, right in the upper part, left in the lower part, center in the lower part, and right in the lower part) and also a position-based additional information display area 102 for displaying additional information to be added to each of adding positions so as to be understood easily is displayed. In the position-based additional information display area 102, contents of additional information set to each position are displayed. The example of the GUI image 100 shows a state where it is set such that a fixed stamp 103a of "CONFIDENTIAL" is printed in an area on the left side of the upper part and it is further set such that a date stamp 103b is printed in an area on the right side of the upper part.

Further, the fixed stamp 103a on the left side of the upper part or the date stamp 103b on the right side of the upper part is selected in such a state to shift to a not-shown GUI image so that deletion or position movement of the selected stamp is able to be performed. As to the position movement, a setting for adding to the lowermost part as shown by the fixed stamp 103a, a setting for adding to the intermediate part as shown by the date stamp 103b, a setting for adding to the uppermost part, and the like are also able to be selected at each of adding positions of left in the upper part, center in the upper part, right in the upper part, left in the lower part, center in the lower part, and right in the lower part. Moreover, a detailed setting of each of adding positions (selection of the lowermost part, the intermediate part, and the uppermost part) may be also executable by selecting the target state presentation image in FIG. 7 or 9. For example, when the target state presentation image is selected, a pop-up image allowing selection out of the three or the GUI image 100 of FIG. 20 may be displayed.

When the stamp 103a or the stamp 103b is selected, for example, it may be possible to return to the GUI image 70 of FIG. 9 or the GUI image 92 of FIG. 17. This makes it possible to receive a user operation for editing or deleting contents of each additional information or a user operation for adding new additional information in selecting the stamp 103a or the stamp 103b. It is possible to change additional information based on the received user operation.

Figure 21:
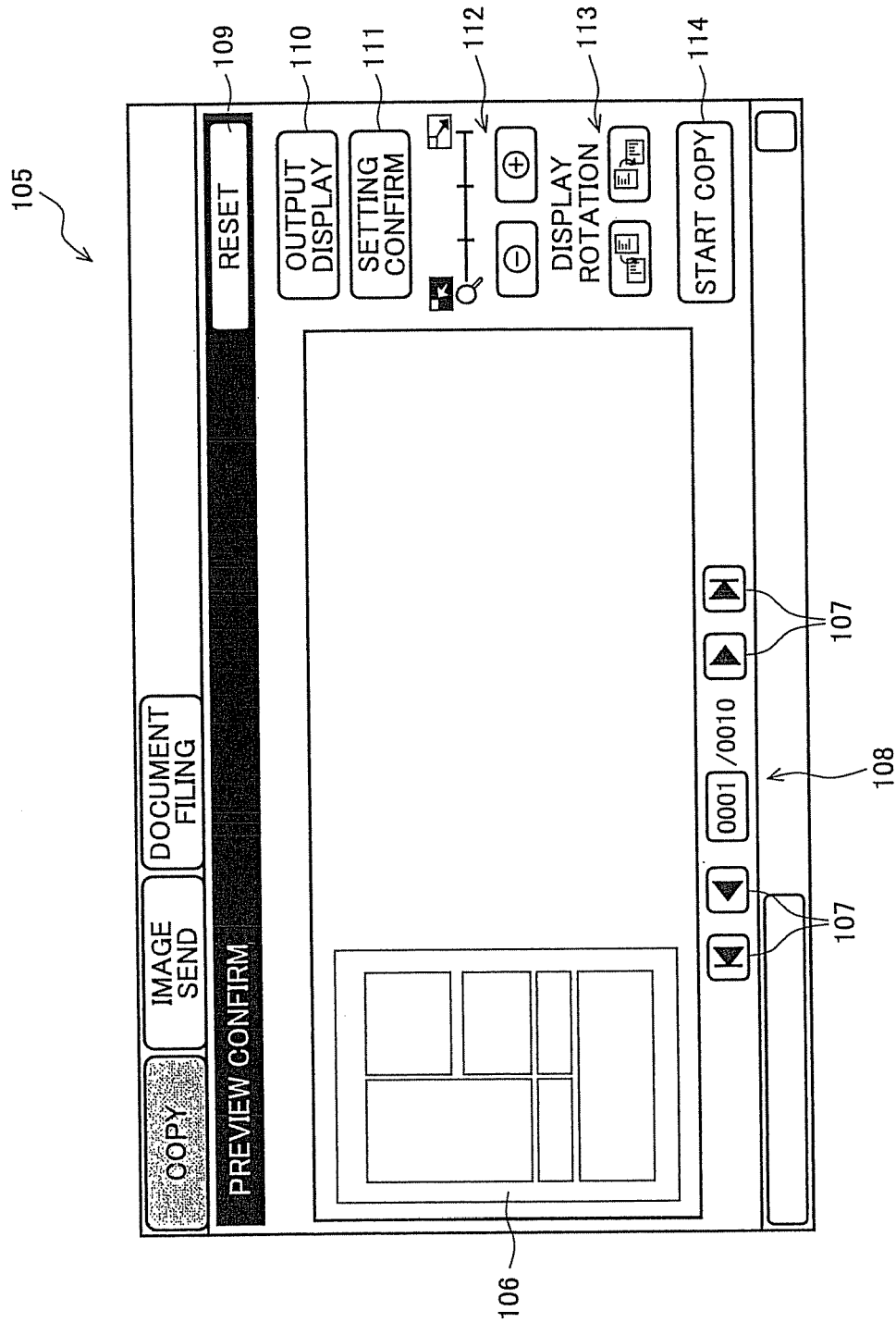
FIG. 21 is a diagram for showing an example of a preview display screen in the digital multi-functional peripheral explained in FIGS. 2 and 3, which shows an example of a preview display in a copy mode.
Figure 22:
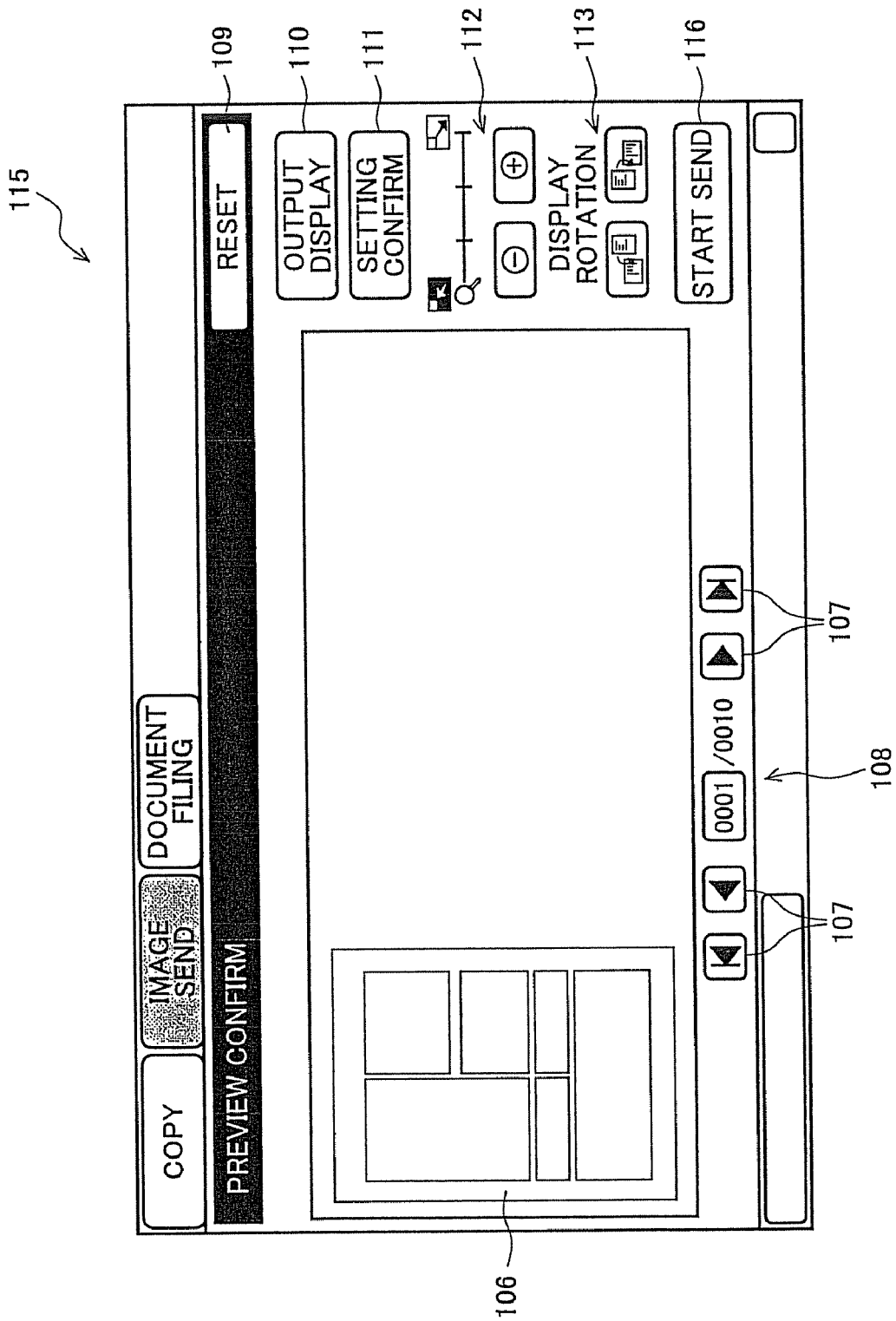
FIG. 22 is a diagram for showing an example of a preview display screen in the digital multi-functional peripheral explained in FIGS. 2 and 3, which shows an example of a preview display in an image send mode.
Figure 23:
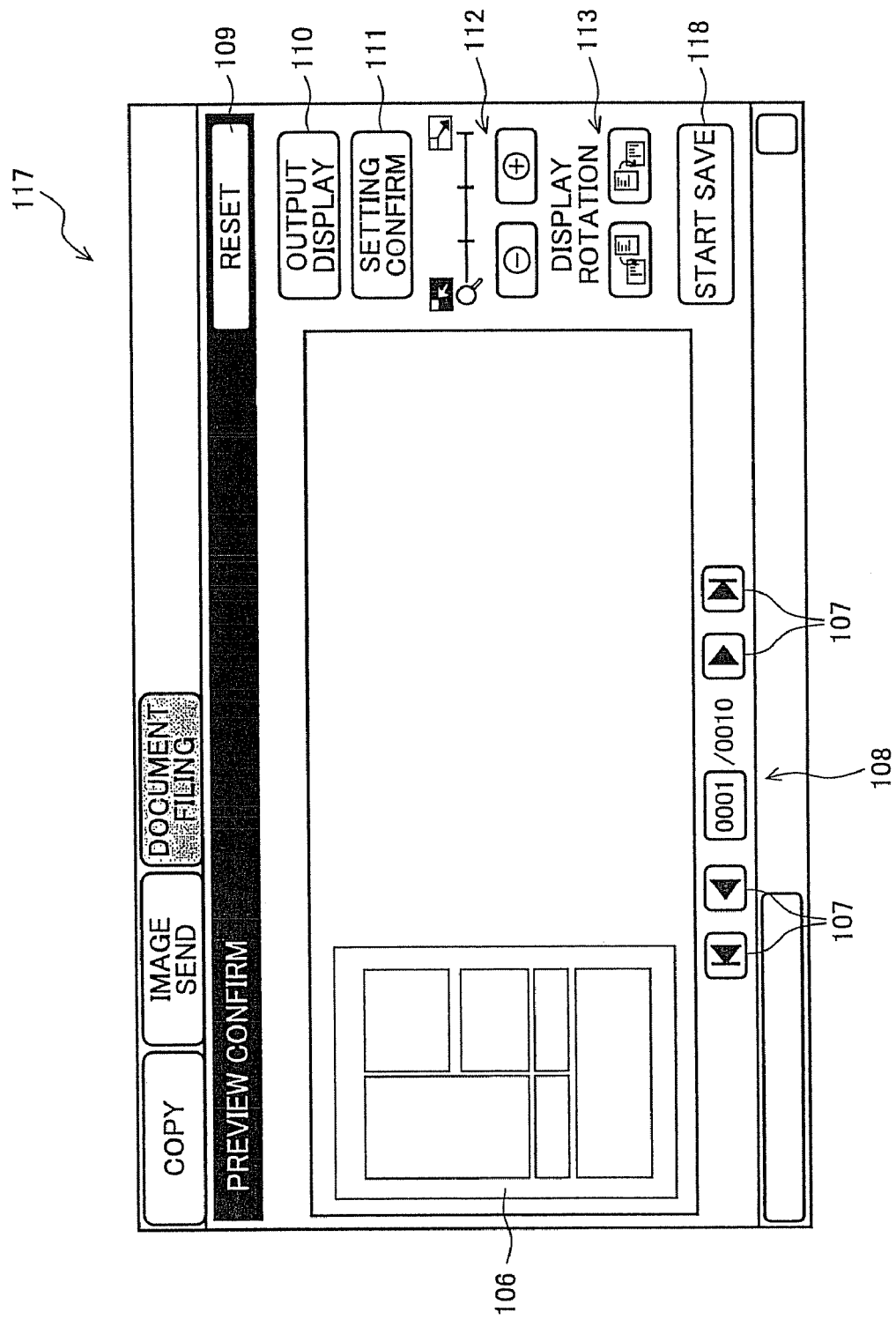
FIG. 23 is a diagram for showing an example of a preview display screen in the digital multi-functional peripheral explained in FIGS. 2 and 3, which shows an example of a preview display in a document filing mode.
Figure 24:
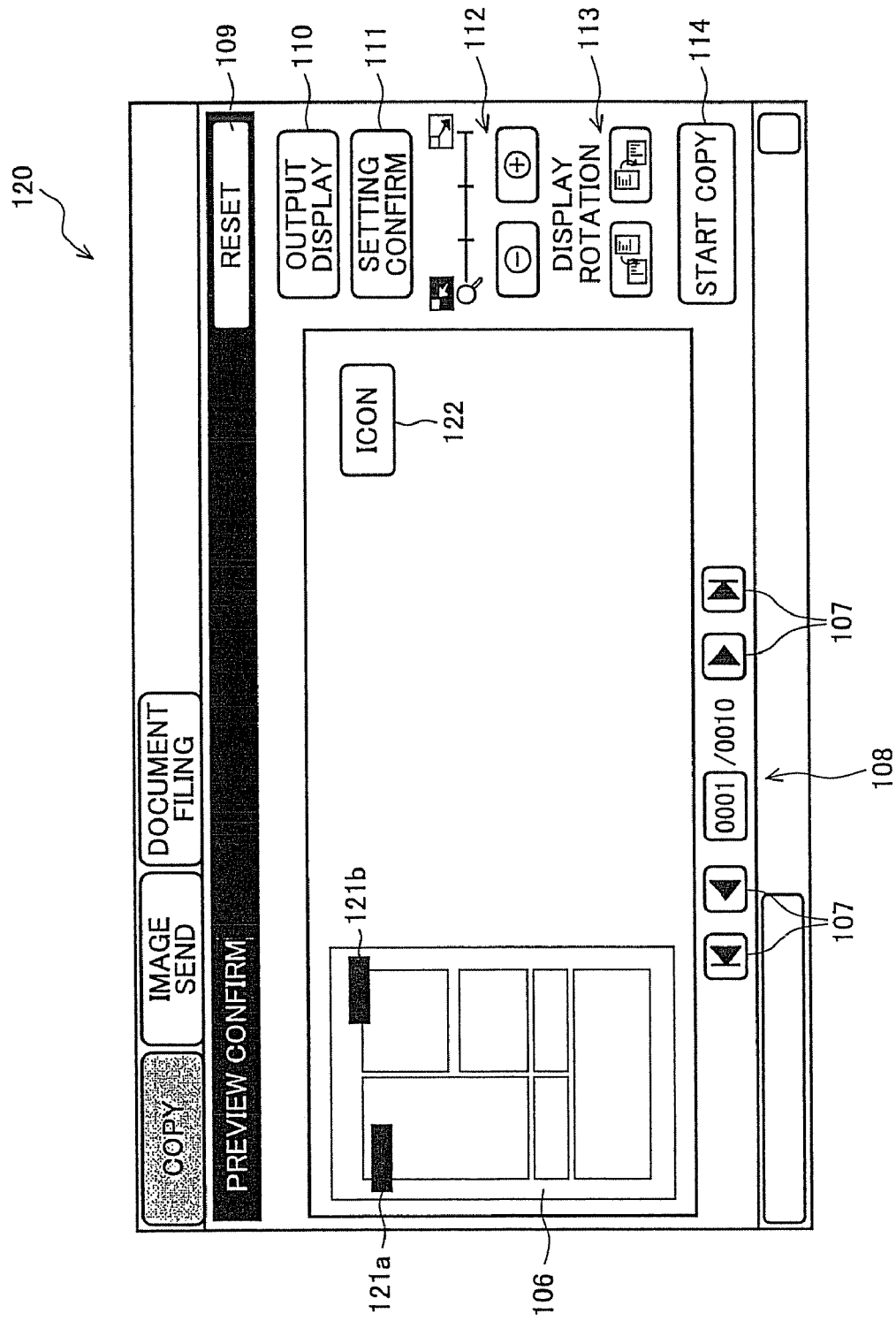
FIG. 24 is a diagram for showing an example of a GUI image when an output display key is selected in the preview display screen of FIG. 21.
Figure 25:
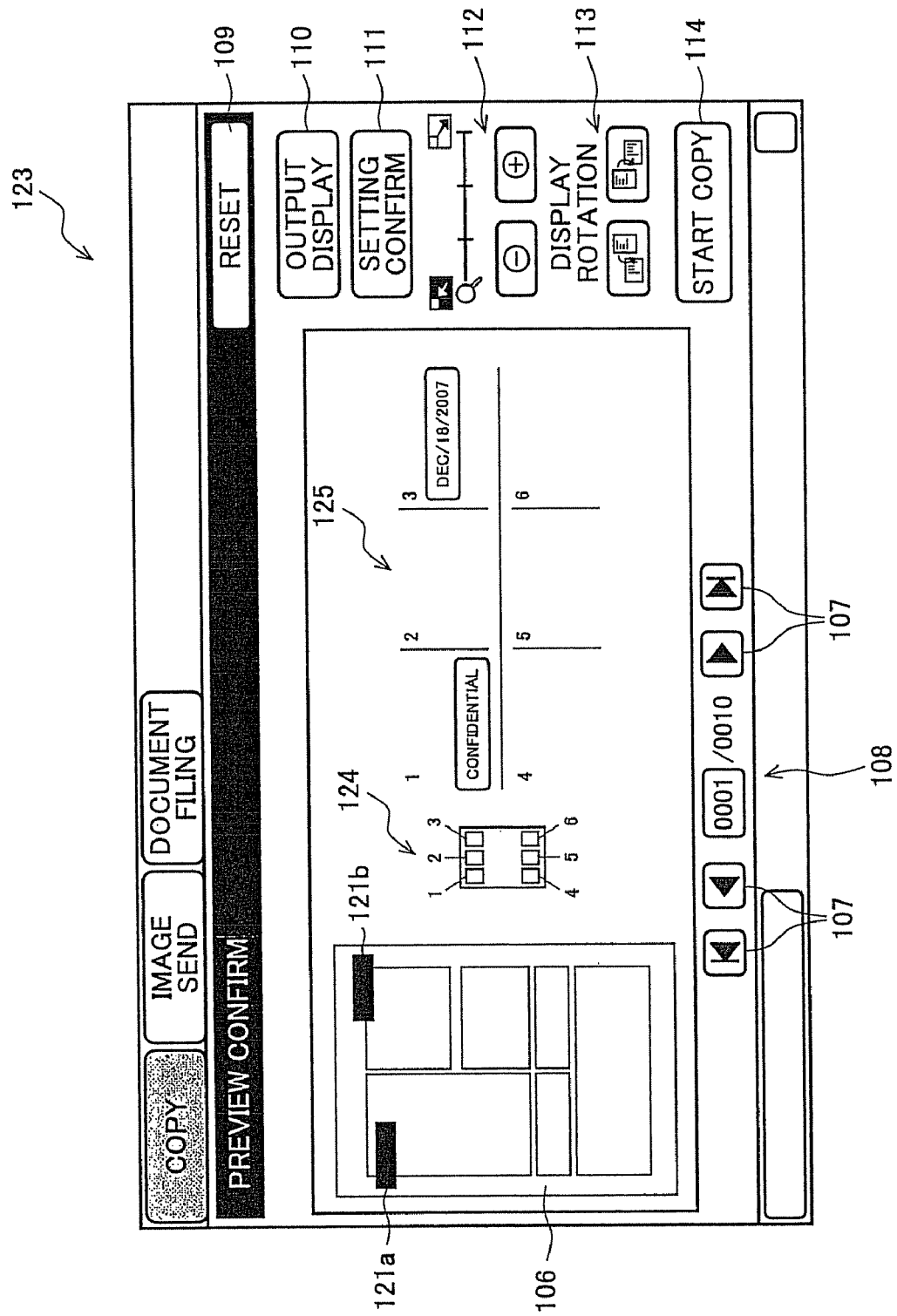
FIG. 25 is a diagram for showing another example of a GUI image when the output display key is selected in the preview display screen of FIG. 21.
Figure 26:
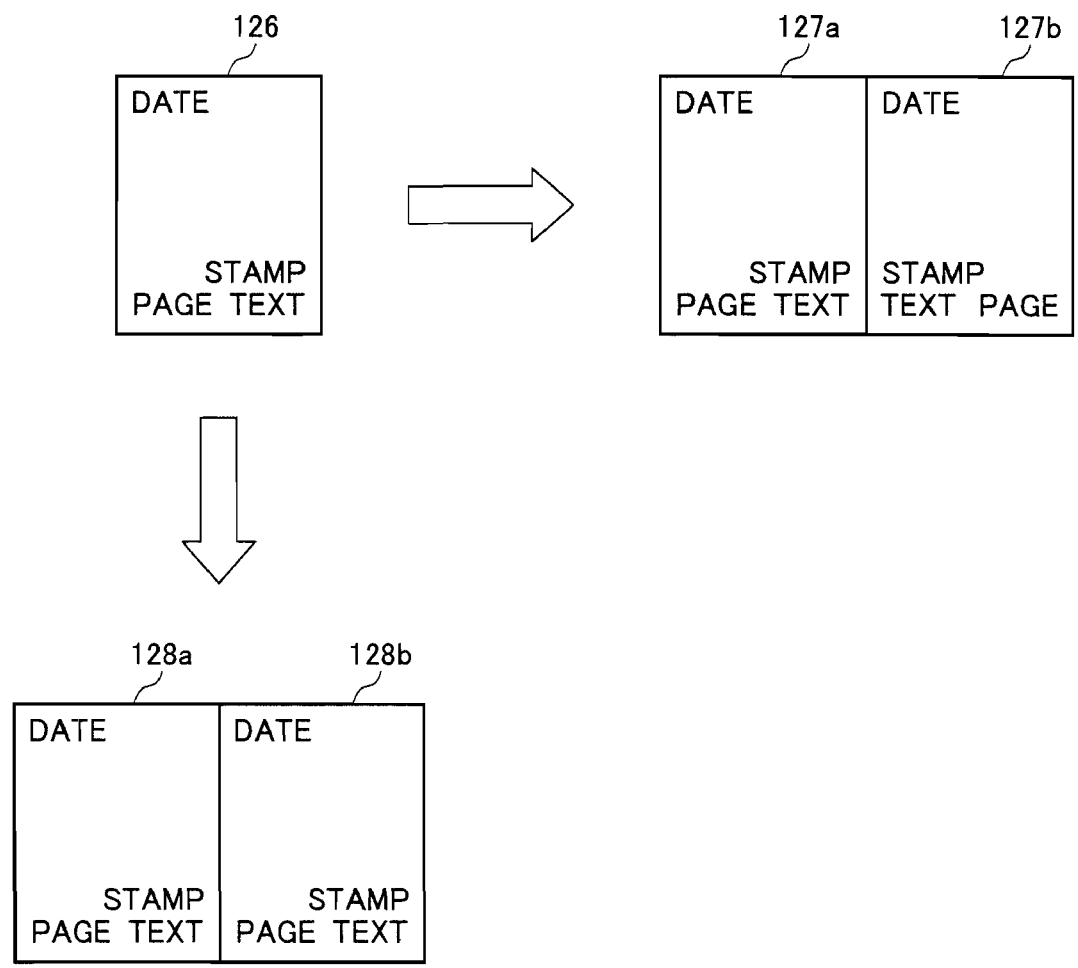
FIG. 26 is a diagram for comparing a position of an existence image of FIG. 24 or 25 to a printing state when printing is actually executed.

Description will be given for an example of a preview display after contents of additional information and an adding position thereof are set with user interface images as shown in FIGS. 4 to 20 with reference to FIGS. 21 to 25. FIGS. 21 to 23 are diagrams for showing an example of a preview display screen in the digital multi-functional peripheral explained in FIGS. 2 and 3, where FIG. 21 shows an example of a preview display in a copy mode, FIG. 22 shows an example of a preview display in an image send mode, and FIG. 23 shows an example of a preview display in a document filing mode. FIG. 24 is a diagram for showing an example of a GUI image when an output display key is selected in the preview display screen of FIG. 21, and FIG. 25 is a diagram for showing another example of a GUI image when the output display key is selected in the preview display screen of FIG. 21.

A GUI image 105 shown in FIG. 21 is displayed when the preview confirm key 45 in the GUI image 40 of FIG. 4 is selected (without shifting to another screen). In the GUI image 105, a preview image 106 generated from image data to be printed by the preview image generating portion 16a as described above is displayed on the touch panel 32 by the panel control portion 11.

The preview image 106 shows reduced image data for each page. Thus, information 108 showing a current page and a page switch key 107 are displayed at the same time on the GUI image 105 to change a page of image data displayed for previewing. The shift key 107 includes a top page shift key for displaying the first page, a previous page shift key for displaying a page before a current page, a next page shift key for displaying page next to a current page, and a last page shift key for displaying the last page. The preview image 106 is displayed for each page in this manner and the user is able to display the preview image of an arbitrary page by operating the page switch key 107 as appropriate.

In the GUI image 105, a setting confirm key 111, an enlarging/reducing key 112, a display rotation key 113, and the like are further displayed so as to be selectable, and by operating these keys appropriately, the user is able to confirm a setting of the preview image 106 or to confirm by enlarging/reducing or rotating the preview image 106. Moreover, in the GUI image 105, a reset key 109 is displayed so as to be selectable. When a necessity of resetting print conditions after confirming the preview image 106 arises, the user is able to display a GUI image for resetting the print conditions by operating the reset key 109. Then, it is possible to reset the print conditions using the resetting screen to display the preview image 106 based on the reset print conditions. In addition, a copy start key 114 is displayed on the GUI image 105 so as to be selectable, and when the user operates the copy start key 114, processing for performing image formation (printing) of the image data displayed for previewing is started. Note that, in facsimile reception, the preview image 106 in the GUI image 105 may be also displayed in the same manner.

Moreover, in the GUI image 105, an output display key 110 for displaying a finish state is also displayed. A GUI image after the selection of the output display key 110 will be described below with reference to FIGS. 24 and 25.

Although description has been given for the preview display in a copy mode with reference to FIG. 21, each of preview displays in an image send mode and in a document filing mode is as illustrated in a GUI image 115 of FIG. 22 and a GUI image 117 of FIG. 23. Note that, when additional information is not set, of course, the GUI images 105, 115, and 117 of FIGS. 21 to 23 are also able to be displayed.

The GUI image 115 is displayed by selecting a preview confirm key (which is the same key as the preview confirm key 45) that is displayed when the image send mode selection key 42 is selected in the GUI image 40 of FIG. 4. In the GUI image 115, the preview image 106 that the preview image generating portion 16a generated, as described above, from image data to be sent by facsimile and the like is displayed on the touch panel 32 by the panel control portion 11. In the GUI image 115, a send start key 116 is displayed so as to be selectable instead of a copy start key 114, and when the user operates the send start key 116, processing for sending image data displayed for previewing to a predetermined sending destination is started.

The GUI image 117 is displayed by selecting a preview confirm key (which is the same key as the preview confirm key 45) that is displayed when the document filing mode selection key 43 is selected in the GUI image 40 of FIG. 4. In the GUI image 105, the preview image 106 that the preview image generating portion 16a generated, as described above, from image data to be filed that is obtained by reading by the reading portion 13 is displayed on the touch panel 32 by the panel control portion 11. In the GUI image 117, a save start key 118 is displayed so as to be selectable instead of the copy start key 114, and when the user operates the save start key 118, processing for filing image data displayed for previewing in the image storage portion 15 is started.

With reference to FIGS. 24 and 25, description will be given for a display of a finish state related to printing in a copy mode (or in facsimile reception). Although the same is also basically applied in image sending and in filing, it is different in terms of that post processing by the post processing apparatus is not included. When the user operates the output display key 110 in a state where the preview image 106 of image data is displayed by the GUI image 105 of FIG. 21, the user is able to confirm a finish state after printing as a preview. The display of the finish state includes at least a display of an existence image related to additional information, and preferably also includes a display of a state after post processing by the post processing apparatus.

Specifically, by selecting the output display key 110, existence images 121a and 121b are displayed by being combined with the preview image 106 as shown in the GUI image 120 of FIG. 24. Generation and synthesis of the existence images 121a and 121b may be executed by the preview image generating portion 16a and the like as described above. FIG. 24 shows the existence images 121a and 121b based on the setting of layout described in FIG. 20. By displaying not additional information but an existence image thereof (figure showing a printing area of additional information), presence/absence of the additional information is visually identified easily even with a small display magnification. In this case, an image showing punch holes or staple may be also displayed at the same time.

Here, a size of the existence images 121a and 121b with respect to the preview image 106 is preferably in accordance with a relative size of additional information to image data to be output. This makes it possible to visually identify a size of an adding area of additional information with respect to the preview image. When the existence images 121a and 121b are synthesized not in accordance with a size of the preview image 106 but in accordance with an actual adding position with respect to image data to be output, at least only arrangement of the additional information is able to be visually identified. In addition, such processing of adjusting an adding position is more preferably executed simultaneously with processing of adjusting a size, thus making it possible to visually identify arrangement and size of the additional information.

Note that, a GUI image 120 of FIG. 24 may be displayed instead of the GUI image 105 of FIG. 21 just by selecting the preview confirm key 45. When processing for directly displaying an additional image showing additional information is performed at the same time, the display may be performed at least with an existence image, particularly, in a state where the entire image data to be printed is displayed for previewing. When not the entire image data to be printed but at least a preview image generated by reducing image data is displayed, that is, except for the case where a preview image having a size not less than that of image data to be printed is displayed with a display magnification, the above-described effect is obtained by displaying not an additional image showing additional information but an existence image.

Moreover, in the GUI image 120 shown in FIG. 24, an icon 122 is displayed in a vicinity of the preview image 106. The icon 122 is an icon for displaying contents of additional information, for example, which may display "display of contents of additional information" or the like, or by configuring so that changing to text, a mark, a color, and a size desired by the user is able to be performed, it is also possible to improve operability and visibility by the user. It is also possible in the GUI image 120 shown in FIG. 24 to change a display position of the icon 122 displayed in a vicinity thereof in accordance with a display magnification of the preview image 106.

By selecting the icon 122, the user is able to shift to a display screen in which all set additional information is able to be confirmed, that is, the GUI image 100 of FIG. 20. By providing such an icon 122, it is possible to confirm details of contents set as additional information and to shift to a contents correction screen immediately. It may be possible to return to the GUI image 120 of FIG. 24 when shifting to the GUI image 100 of FIG. 20 is performed, confirmation and, as the occasion demands, correction are performed, and OK is selected in the GUI image 100. For example, when the existence images 121a and 121b that are displayed so as to be selectable are selected, details of contents of additional information of the corresponding existence image only may be displayed or details of contents of additional images for all of the existence images may be displayed by shifting to the GUI image 100 or the like. In this manner, the icon 122 may not be displayed.

In this manner, while a preview image is displayed, a predetermined icon is displayed in a display area different from a display area of the preview image, and when the predetermined icon is selected by the user, contents (details) of additional information may be displayed in a display area different from the display area of the preview image (the icon may be deleted in this case) or the preview image may be deleted to display the contents also using the area where the preview image has been displayed. Moreover, when the icon is selected by the user, as illustrated in the stamps 103a and 103b (also including contents of stamps) in the GUI image 100, a list of all additional information added to image data to be output is preferably displayed as the above-described contents. Further, as the example in which stamps 103a and 103b (also including contents of stamps) are displayed in the position-based additional information display area 102 in the GUI image 100, when the list of all additional information is displayed, the display is preferably performed so that each of the additional information is arranged in association with image data to be output.

As described in the processing when the stamps 103a and 103b are selected in the GUI image 100, the digital multi-functional peripheral 1 is preferably provided with an additional information changing portion that receives a user operation for editing or deleting each of additional information displayed as a list or a user operation for adding new additional information and changes additional information based on the received user operation. In this manner, additional information displayed as a list is able to be selected by the user individually and addition, edition, or deletion thereof is also able to be performed individually. Further, after additional information is changed by the additional information changing portion, when a preview image is deleted like in the GUI image 100 of FIG. 20, the preview image is displayed again so that changed contents are able to be confirmed.

A GUI image 123 illustrated in FIG. 25 is displayed when the output display key 110 is selected in the GUI image 120 or when the output display key 110 is selected in the GUI image 105 of FIG. 21. Further, the GUI image 123 may be displayed when the existence images 121a and 121b that are displayed so as to be selectable are selected. In the GUI image 123, similarly to the GUI image 100 of FIG. 20, an image 124 corresponding to recording paper (recording paper image) is displayed so as to show each of adding positions and at the same time, a position-based additional information display area 125 for displaying additional information to be added to each of the adding positions so as to be understood easily is displayed and contents of additional information set to each of the positions are also displayed.

The position of the existence image as shown in FIGS. 24 and 25 is generally identical to the position in the printed state when printing is actually executed, but may be different in the case of saddle stitch printing or the like. Such an example will be described with reference to FIG. 26. When an existence image corresponding to date and time, a fixed stamp, a page number, and arbitrary text is displayed in a preview image 126, additional information is printed in a state of being added on a position as it is in a print page 127a which is on the left side of spread pages, while only additional information of date and time is added on the same position in a print page 127b which is on the right side and other additional information is printed in a state of being added on symmetry positions to a boundary line between the left side and the right side. Of course, even in the case of saddle stitch printing, additional information may be added on a position as it is in both a print page 128a on the left side of spread pages and a print page 128b on the right side thereof.

Figure 27A:
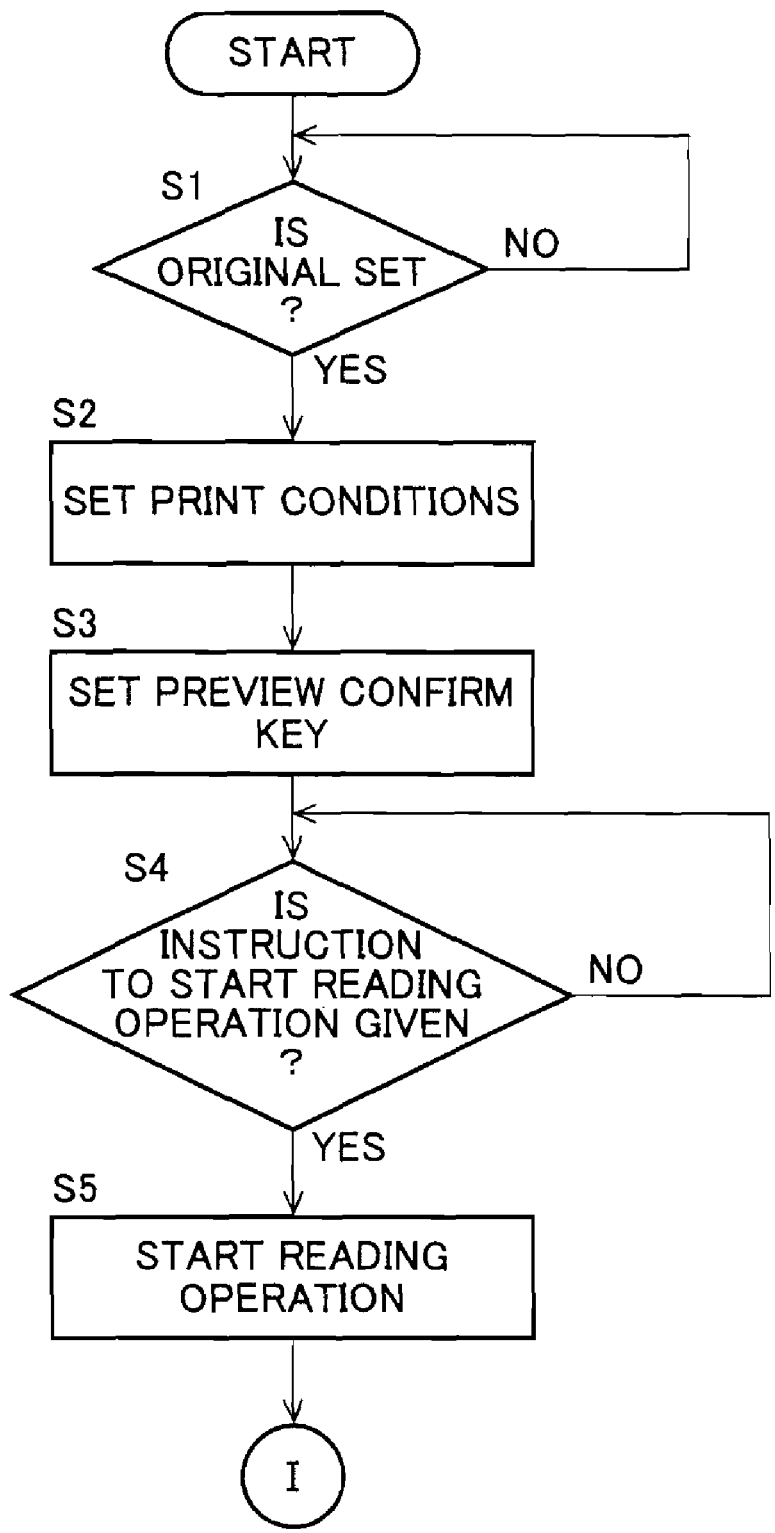

Next, description will be given for the flow when an original image to be printed (targeted for image formation) is read to be displayed for previewing with reference to FIGS. 27A and 27B. FIGS. 27A and 27B are flowcharts for explaining an example of processing when performing a preview display in printing in the digital multi-functional peripheral of FIGS. 2 and 3.

First, the main control portion 18 confirms whether an original is set on a document table or a document feeder in the reading portion 13 (step S1), and when the original is set (in the case of YES at step S1), a user operation for setting print conditions is received to reflect the setting (step S2). Then, the main control portion 18 performs a setting of the preview confirm key (step S3). When the preview confirm key of FIG. 4 is operated by a user before a copy is started, it is set such that a preview image is displayed after reading image data.

Then, the main control portion 18 waits for an instruction to start a reading operation (step S4), and when the instruction is received, instructs the reading portion 13 to perform original reading (step S5). Whereby, the reading portion 13 starts the original reading. Subsequently, the main control portion 18 instructs the preview image generating portion 16a to execute processing of generating a preview image based on the read image data (step S6) and instructs the panel control portion 11 to display the preview image on the touch panel 32 (step S7). With this processing, for example, the GUI image of FIG. 21 is displayed.

In the display state of the preview image 106 by the GUI image 105, the main control portion 18 determines whether or not an instruction by the output display key 110 is given (step S8). When the instruction by selecting the output display key 110 is not given, whether or not an instruction to start a copy by the copy start key 114 is given is then determined (step S9), and when the instruction to start a copy is given, printing processing of the image data is started (step S10). Alternatively, when the instruction to start a copy is not given at step S9, the procedure returns to step S8.

When the instruction by the output display key 58 is given at step S8, the main control portion 18 instructs the preview image generating portion 16a to generate an existence image. Then, the panel control portion 11 performs a preview display of a finish state in which the existence image generated as described above is added to the preview image 106 like in the GUI image 120 of FIG. 24 on the touch panel 32 (step S11). At the same time, the icon 122 is also displayed.

Then, the main control portion 18 determines whether or not a selection instruction by the icon 122 is given, and when the selection instruction is given, confirmation and resetting of a position and contents of additional information are performed (step S14), and the procedure returns to step S7 to perform a preview display and wait for an instruction to display an output again. Alternatively, the procedure may return to step S11 after step S14. On the other hand, when the selection instruction is not given at step S12, the main control portion 18 also determines whether or not a selection instruction by an existence image key is given (step S13), and when the selection instruction is given, confirmation and resetting of a position and contents of additional information are performed (step S14) to return to step S7 (or step S12). On the other hand, when the selection instruction is not given at step S14, the main control portion 18 determines whether or not an instruction to start a copy by the copy start key 114 is given (step S15), and when the instruction to start a copy is given, printing processing of the image data is started (step S10), and when the instruction to start a copy is not given, the procedure returns to step S12.

In the above, description has been given for the preview display accompanied by the existence image of the present invention with reference to the digital multi-functional peripheral 1, such a preview display is also able to be executed by a control program (printer driver) for the digital multi-functional peripheral 1 incorporated in a PC (such as PC 2 or PC 3 of FIG. 1) connected to the digital multi-functional peripheral 1. The control program is an execution type program for causing a PC to execute processing, an intermediate code program, or a source program. The control program may be recorded in a not-shown computer readable recording medium. In addition, the control program may be installed in a storage apparatus of the PC such as a hard disc from the recording medium. As a result, the control program is freely carried to an installation location of the PC. The recording medium corresponds to, for example, a program medium that is inserted into an external storage apparatus to be read/written. The program medium corresponds to those of a tape type such as a magnetic tape and a cassette tape; those of a magnetic disk type such as a flexible disk and a hard disk; those of an optical disk type such as a CD-ROM (Compact Disc ROM), an MO (Magneto-Optical disc), an MD (Mini Disc), and a DVD (Digital Versatile Disc); and those of a card type such as an IC (Integrated Circuit) card including a memory card or an optical card. Moreover, the recording medium may be a semiconductor element such as a mask ROM, an EPROM (Erasable Programmable ROM), an EEPROM (Electrically Erasable and Programmable ROM), and a flash ROM.

Figure 28:
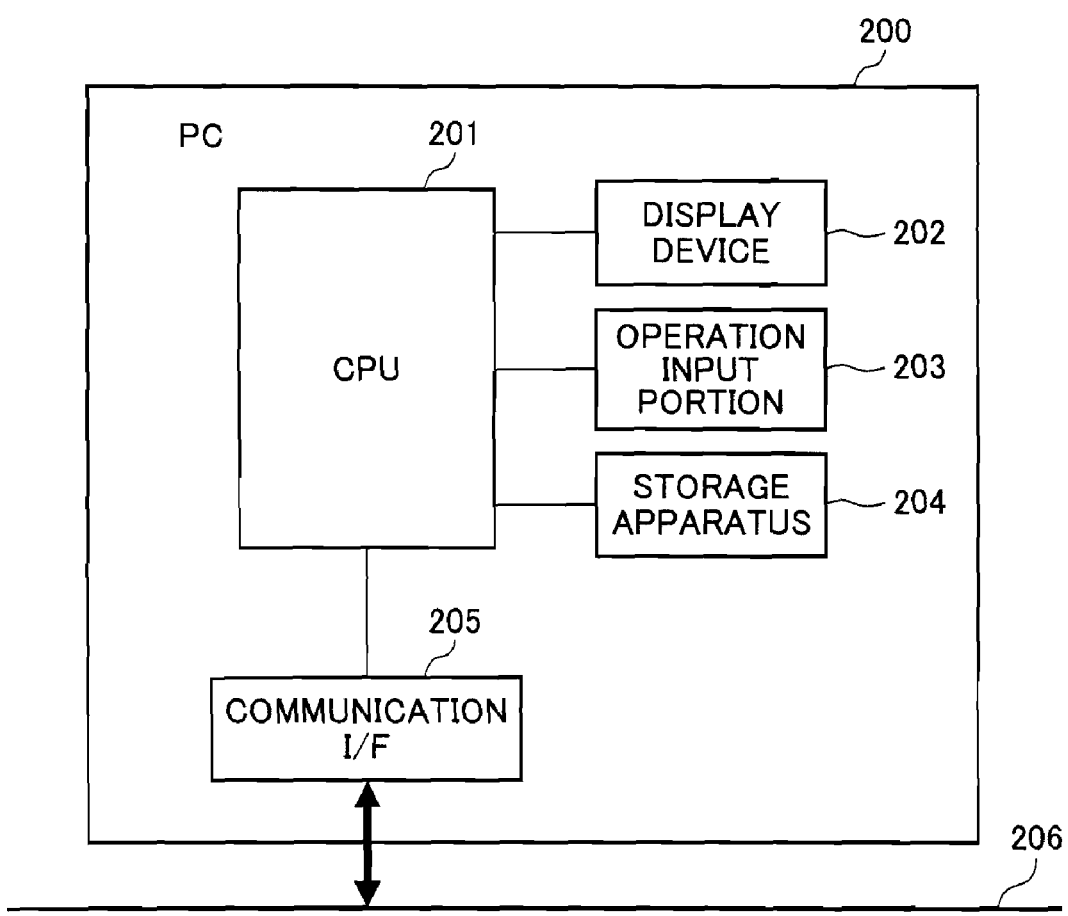
FIG. 28 is a diagram for showing an exemplary configuration of a general PC, which also shows an exemplary configuration of a PC into which a printer driver of the present invention is able to be incorporated.

FIG. 28 is a diagram for showing an exemplary configuration of a general PC, which also shows an exemplary configuration of a PC into which a printer driver of the present invention is able to be incorporated. A PC 200 illustrated in FIG. 28 is provided with a display device 202 which is an example of a display portion, an operation input portion 203 composed of a keyboard, a pointing device, or the like, a storage apparatus 204 composed of a hard disc, a RAM, or a ROM, a communication I/F 205 for connecting to an external device such as the digital multi-functional peripheral 1 via a network 206, and a CPU 201 for executing various calculation processing to perform control thereof.

An operation system that performs basic control is stored in the ROM or the hard disc so as to be executable by being expanded on the RAM by the CPU 201. In the hard disc, the printer driver according to the present invention as well as application software such as document creation software and figure creation software is stored similarly so as to be executable by being expanded on the RAM by the CPU 201. The printer driver sends a printing command related to image data generated by, for example, document creation software or drawings creation software to the digital multi-functional peripheral 1 while communicating with the digital multi-functional peripheral 1 connected by the network 206 or the like through the communication I/F 205. An operation of the application software, a print setting by the printer driver, a preview display, and the like are executed by a user operation from the operation input portion 203.

The printer driver according to the present invention is a program for causing the PC 200 to execute a step of generating a preview image from image data to be output by the digital multi-functional peripheral 1 to display on the display device 202 of the PC 200 and a step of, when the image data to be output by the digital multi-functional peripheral 1 is output with additional information added thereto, generating an existence image showing an existence of the additional information instead of the additional information and combining it with the preview image to display on the display device 202 in displaying the preview image.

Figure 29:
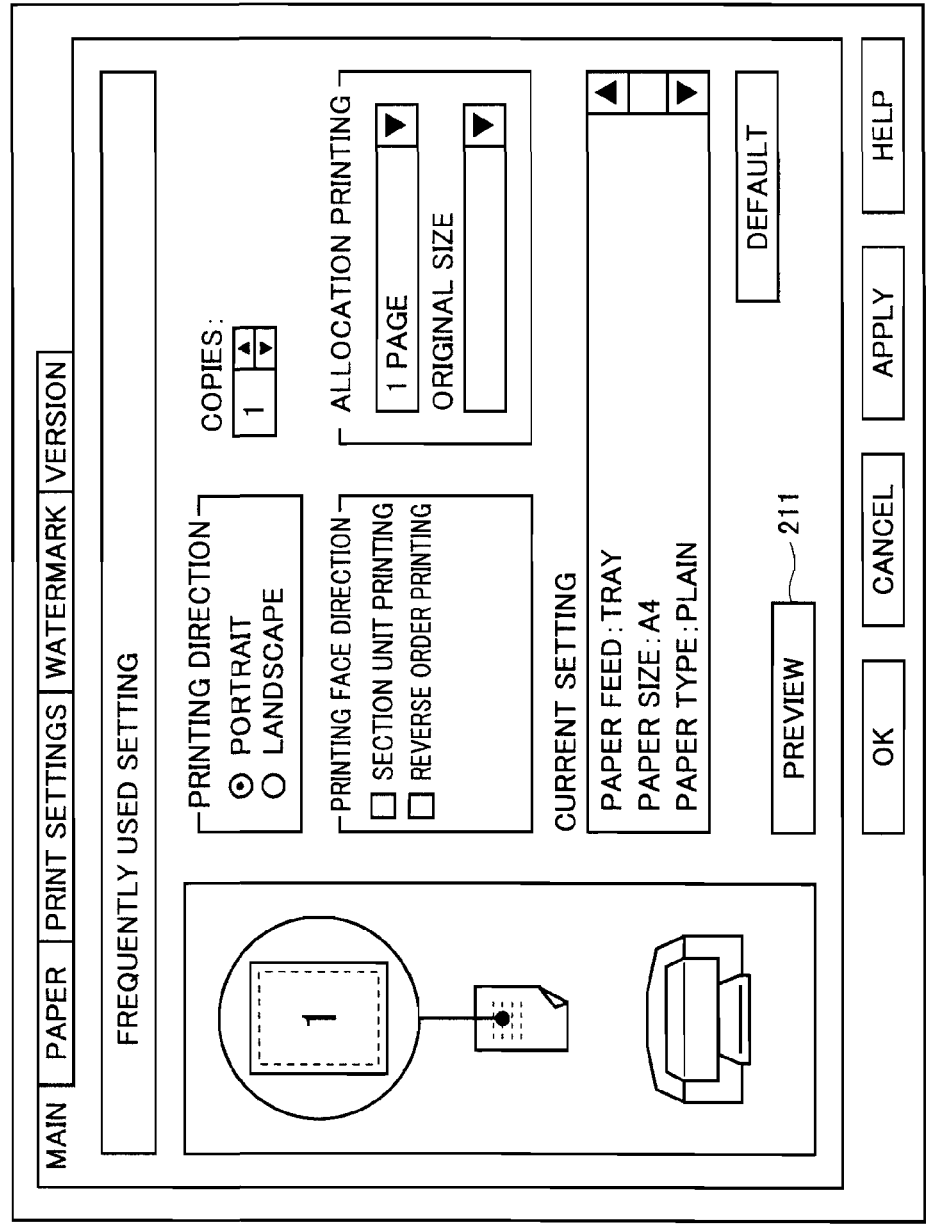
FIG. 29 is a diagram for showing an example of a GUI image for a print setting in the print driver according to the present invention.
Figure 30:
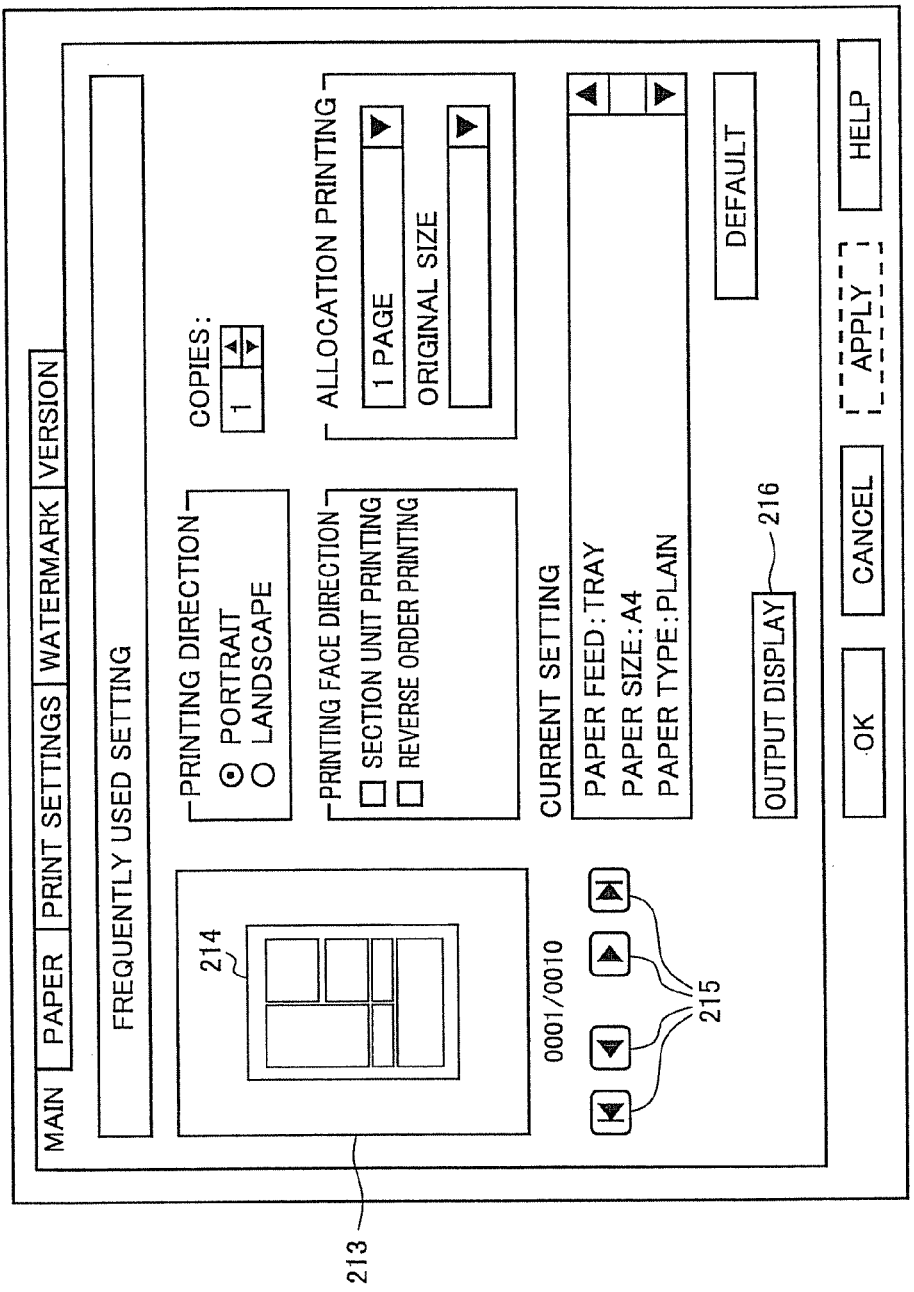
FIG. 30 is a diagram for showing an example of a GUI image that is displayed when a preview confirm key is selected in FIG. 29.
Figure 31:
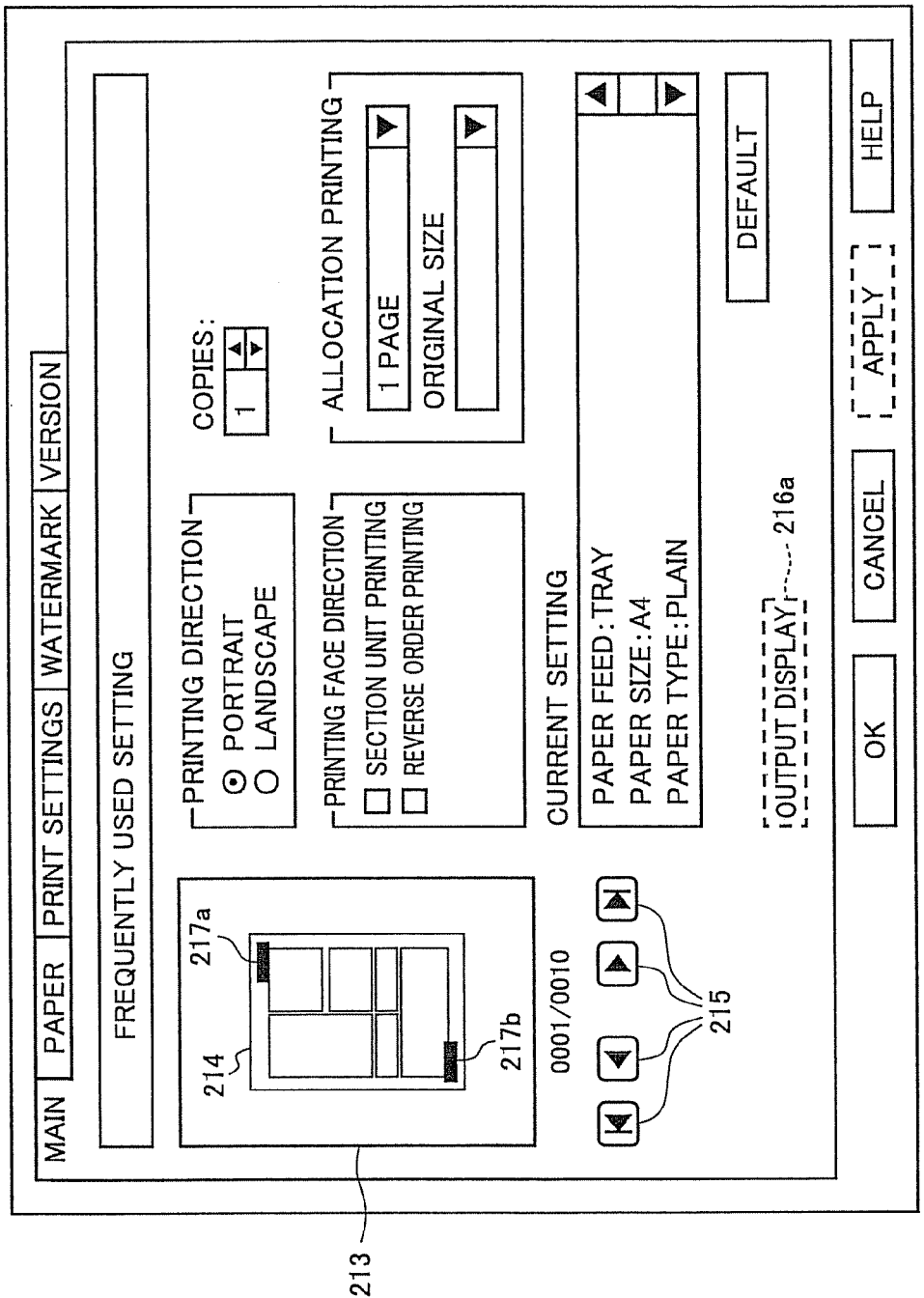
FIG. 31 is a diagram for showing an example of a GUI image that is displayed when an output display key is selected in FIG. 30.

FIGS. 29 to 31 are diagrams for showing an example of a GUI image for setting a series of printing in the printer driver according to the present invention. In a GUI image 210 shown in FIG. 29, similarly to a general printer driver, a preview confirm key 211 is displayed so as to be selectable in addition to setting items such as a printing direction and the number of printing. The preview confirm key 211 is selected to shift to a GUI image 212 shown in FIG. 30. In the GUI image 212, a preview image 214 generated from image data to be printed is displayed in a preview display area 213 and a display switch key 215 for changing a display page of the preview image 214 is also displayed so as to be selectable.

In the GUI image 212, an output display key 216 is further displayed so as to be selectable. The output display key 216 is selected to shift to a GUI image 217 shown in FIG. 31. In the GUI image 217, existence images 217a and 217b for showing an existence of additional information by overlaying on the preview image 214 are displayed in the preview display area 213 in the same manner as the description for the GUI image 120 of FIG. 24. At this time, an output display key 216 is not selected.

This example shows an existence image when certain additional information is set to the upper right and lower left of image data to be printed and, of course, settings of contents and positions of the additional information are also able to be performed with the printer driver. In addition, since application examples related to the existence images 217a and 217b, for example, displaying a predetermined icon, changing a color of the existence image, displaying a list when the existence image is selected, and the like, are all applicable in the same manner as in the preview display in the digital multi-functional peripheral 1, description thereof will be omitted. By selecting, for example, an OK key in the GUI image 217, a printing instruction with additional information added is sent to the side of the digital multi-functional peripheral 1 to execute printing.

Further, the present invention may employ a configurate as a preview display method as follows. That is, the preview display method includes a step in which a computer (illustrated as the PC 200) generates a preview image from image data to be output by the digital multi-functional peripheral 1 connected to the PC 200 to display on the display device 202 of the PC 200 and a step in which, when the image data is output by the digital multi-functional peripheral 1 with additional information added thereto, the PC 200 generates an existence image showing an existence of the additional information instead of the additional information and synthesizes with the preview image to display on the display device 202.

According to the present invention, the following effect may be obtained.

According to the present invention, it is possible to visually identify whether or not additional information is added to image data to be output in a screen in which a preview of the image data to be output is displayed easily.

The invention claimed is:

1. An image forming apparatus that includes an image display portion for displaying a preview image of image data to be output with additional information added thereto, comprising:
   a display control portion that, when the image data to be output is output with the additional information added thereto, synthesizes an existence image showing an existence of the additional information, instead of the additional information, with the preview image to display on the image display portion in displaying the preview image,
   wherein the display control portion synthesizes the existence image in accordance with an actual adding position of the image data to be output,
   the existence image that is synthesized does not include the additional information itself, and
   a size of the existence image to the preview image is in accordance with a relative size of the additional information to the image data to be output.

2. The image forming apparatus as defined in claim 1, wherein
   the preview image is an image generated by reducing the image data to be output.

3. The image forming apparatus as defined in claim 1, wherein
   the display control portion displays a predetermined icon in a display area different from a display area of the preview image in the image display portion while the preview image is being displayed, and when the predetermined icon is selected by a user, contents of the additional information are displayed in a display area different from the display area of the preview image in the image display portion or displayed by deleting the preview image.

4. The image forming apparatus as defined in claim 3, wherein
   when the predetermined icon is selected by a user, the display control portion displays a list of all of additional information to be added to the image data to be output as the contents.

5. The image forming apparatus as defined in claim 4, wherein
   in displaying the list of all of additional information, the display control portion displays each additional information in an arrangement associated with the image data to be output.

6. The image forming apparatus as defined in claim 4, wherein
   an additional information changing portion that receives a user operation for editing or deleting each of additional information displayed as the list by the image display portion or a user operation for adding new additional information, and changes additional information based on the received user operation, is included.

7. The image forming apparatus as defined in claim 6, wherein when the preview image is deleted after additional information is changed by the additional information changing portion, the display control portion displays the preview image again.

8. The image forming apparatus as defined in claim 1, wherein
a setting portion for setting a display color of the existence image by a user is included.

9. The image forming apparatus as defined in claim 1, wherein
the image data to be output is image data that is input from any of a scanner apparatus, an attachable/detachable storage apparatus, and a communication line, or image data that is read from a storage apparatus provided in the image forming apparatus.

10. A non-transitory computer-readable medium storing a program to be installed in a computer connected to an image forming apparatus, wherein
the program causes the computer to execute:
a step of generating a preview image from image data to be output by the image forming apparatus to display on a display portion of the computer; and
a step of, when the image data is output with additional information added thereto by the image forming apparatus, generating an existence image showing an existence of the additional information, instead of the additional information, and synthesizing with the preview image to display on the display portion in displaying the preview image,
wherein the existence image is synthesized in accordance with an actual adding position of the image data to be output,
the existence image that is synthesized does not include the additional information itself, and
a size of the existence image to the preview image is in accordance with a relative size of the additional information to the image data to be output.

11. A preview display method, comprising:
a step in which a computer generates a preview image from image data to be output by an image forming apparatus connected to the computer to display on a display portion of the computer; and
a step in which, when the image data is output with additional information added thereto by the image forming apparatus, the computer generates an existence image showing an existence of the additional information, instead of the additional information, and synthesizes with the preview image to display on the display portion in displaying the preview image,
wherein the existence image is synthesized in accordance with an actual adding position of the image data to be output,
the existence image that is synthesized does not include the additional information itself, and
a size of the existence image to the preview image is in accordance with a relative size of the additional information to the image data to be output.

* * * * *